United States Patent
Butts

(10) Patent No.: US 12,504,227 B2
(45) Date of Patent: Dec. 23, 2025

(54) SYSTEM AND METHOD FOR NATURAL GAS LIQUID PRODUCTION WITH FLEXIBLE ETHANE RECOVERY OR REJECTION

(71) Applicant: BCCK Holding Company, Midland, TX (US)

(72) Inventor: Rayburn C. Butts, Midland, TX (US)

(73) Assignee: BCCK Holding Company, Midland, TX (US)

( * ) Notice: Subject to any disclaimer, the term of this patent is extended or adjusted under 35 U.S.C. 154(b) by 0 days.

(21) Appl. No.: 16/113,215

(22) Filed: Aug. 27, 2018

(65) Prior Publication Data

US 2020/0064064 A1     Feb. 27, 2020

(51) Int. Cl.
    *F25J 3/02*            (2006.01)

(52) U.S. Cl.
     CPC .......... *F25J 3/0295* (2013.01); *F25J 3/0209* (2013.01); *F25J 3/0238* (2013.01); *F25J 3/0242* (2013.01);
(Continued)

(58) Field of Classification Search
     CPC .. F25J 2215/64; F25J 2200/02; F25J 2200/76; F25J 2200/78; F25J 2210/06;
(Continued)

(56) References Cited

U.S. PATENT DOCUMENTS

| | | | |
|---|---|---|---|
| 2,442,474 A | 6/1948 | Scarth | |
| 4,155,729 A * | 5/1979 | Gray | F25J 3/0209 62/621 |

(Continued)

FOREIGN PATENT DOCUMENTS

WO     WO2010109228     9/2010

OTHER PUBLICATIONS

Ortloff Engineers, LTD, Single Column Overhead Recycle Process (SCORE); https://www.uop.com/?document=ortloffs-single-column-overhead-recycle-score-process&down-load=1, retrieved Nov. 20, 2018.

(Continued)

*Primary Examiner* — John F Pettitt, III
(74) *Attorney, Agent, or Firm* — Scheef & Stone, LLP; Robin L. Barnes

(57) ABSTRACT

A system and method for processing an NGL product stream from a natural gas feed stream in either an ethane retention or ethane rejection mode utilizing heat exchange of particular process streams. In ethane rejection mode, there are preferably two stages of heat exchange between the feed stream and a first separator bottoms stream and a side stream withdrawn from a fractionation tower is cooled through heat exchange with both the fractionation tower and second separator overhead streams, and optionally with an external refrigerant, resulting in 5-15% ethane and at least 97% propane recovery. In ethane retention mode, a portion of the feed stream and portions of a first separator overhead and bottoms streams are preferably separately cooled through heat exchange with other process streams, including the entireties of a recycled residue gas and fractionation column overhead streams, resulting in around 99% ethane and around 100% propane recovery.

18 Claims, 4 Drawing Sheets

(52) U.S. Cl.
CPC ........ *F25J 2200/02* (2013.01); *F25J 2200/92* (2013.01); *F25J 2200/94* (2013.01); *F25J 2210/60* (2013.01); *F25J 2215/62* (2013.01); *F25J 2215/64* (2013.01); *F25J 2280/02* (2013.01)

(58) Field of Classification Search
CPC .. F25J 2235/60; F25J 2270/02; F25J 2270/90; F25J 3/0233; F25J 3/0238; F25J 3/0242; Y02C 20/40
See application file for complete search history.

(56) References Cited

U.S. PATENT DOCUMENTS

| | | |
|---|---|---|
| 4,157,904 A | 6/1979 | Campbell et al. |
| 4,278,457 A | 7/1981 | Campbell et al. |
| 4,451,275 A | 5/1984 | Vines et al. |
| 4,504,295 A | 3/1985 | Davis et al. |
| 4,609,390 A | 9/1986 | Wilson |
| 4,617,039 A | 10/1986 | Buck |
| 4,664,686 A | 5/1987 | Pahade et al. |
| 4,687,499 A * | 8/1987 | Aghili ............... F25J 3/0233 62/621 |
| 4,746,342 A | 5/1988 | DeLong et al. |
| 4,758,258 A | 7/1988 | Mitchell et al. |
| 4,767,428 A | 8/1988 | Apffel |
| 4,948,403 A | 8/1990 | Lepperhoff |
| 5,051,120 A | 9/1991 | Pahade et al. |
| 5,141,544 A | 8/1992 | Butts |
| 5,257,505 A | 11/1993 | Butts |
| 5,375,422 A | 12/1994 | Butts |
| 5,568,737 A * | 10/1996 | Campbell ............ F25J 3/0242 62/621 |
| 5,799,507 A | 9/1998 | Wilkinson et al. |
| 6,182,469 B1 | 2/2001 | Campbell et al. |
| 6,401,486 B1 | 6/2002 | Lee et al. |
| 6,758,060 B2 | 7/2004 | O'Brien |
| 7,377,127 B2 * | 5/2008 | Mak ............... F25J 3/0209 62/630 |
| 7,793,517 B2 * | 9/2010 | Patel ............... F25J 3/0209 62/617 |
| 7,818,979 B2 | 10/2010 | Patel et al. |
| 7,856,847 B2 | 12/2010 | Patel et al. |
| 8,881,549 B2 | 11/2014 | Johnke et al. |
| 9,003,829 B2 * | 4/2015 | Bauer ............... F25J 3/0233 62/620 |
| 9,021,831 B2 | 5/2015 | Johnke et al. |
| 9,052,136 B2 | 6/2015 | Johnke et al. |
| 9,052,137 B2 | 6/2015 | Johnke et al. |
| 9,057,558 B2 | 6/2015 | Johnke et al. |
| 9,068,774 B2 | 6/2015 | Johnke et al. |
| 9,074,814 B2 | 7/2015 | Johnke et al. |
| 9,080,810 B2 | 7/2015 | Pitman et al. |
| 9,080,811 B2 | 7/2015 | Johnke et al. |
| 9,637,428 B2 | 5/2017 | Hudson et al. |
| 9,927,171 B2 | 3/2018 | Hudson et al. |
| 9,933,207 B2 | 4/2018 | Johnke et al. |
| 9,939,195 B2 | 4/2018 | Johnke et al. |
| 9,939,196 B2 | 4/2018 | Johnke et al. |
| 10,533,794 B2 | 1/2020 | Lynch et al. |
| 10,551,118 B2 | 2/2020 | Hudson et al. |
| 10,551,119 B2 | 2/2020 | Miller et al. |
| 2001/0052241 A1 | 12/2001 | Jain et al. |
| 2003/0177786 A1 | 9/2003 | O'Brien |
| 2005/0247078 A1 * | 11/2005 | Wilkinson ............ F25J 1/0022 62/612 |
| 2006/0032269 A1 | 2/2006 | Cuellar et al. |
| 2006/0144081 A1 | 7/2006 | Paradowski |
| 2006/0150672 A1 | 7/2006 | Lee et al. |
| 2006/0283207 A1 | 12/2006 | Pitman et al. |
| 2007/0157663 A1 | 7/2007 | Mak et al. |
| 2008/0078205 A1 | 4/2008 | Cuellar et al. |
| 2009/0100862 A1 | 4/2009 | Wilkinson et al. |
| 2010/0011810 A1 * | 1/2010 | Mak ............... F25J 3/0238 62/630 |
| 2010/0192627 A1 | 8/2010 | Briend |
| 2011/0023536 A1 | 2/2011 | Jager et al. |
| 2011/0067441 A1 | 3/2011 | Martinez et al. |
| 2011/0174017 A1 * | 7/2011 | Victory ............... F25J 3/0233 62/620 |
| 2011/0277500 A1 | 11/2011 | Bauer et al. |
| 2014/0013797 A1 * | 1/2014 | Butts ............... F25J 3/0233 62/620 |
| 2014/0303422 A1 | 10/2014 | Das et al. |
| 2017/0051970 A1 | 2/2017 | Mak |
| 2018/0149424 A1 | 5/2018 | Oelfke et al. |

OTHER PUBLICATIONS

Ortloff Engineers, LTD, Recycle Split Vapor Process; https://www.uop.com/files/RSV.pdf, retrieved Nov. 20, 2018.
Pitman, Richard N., Hudson, Hank M., and Wilkinson, John D., Next Generation Processes for NGL/LPG Recovery, http://www.ou.edu/class/che-design/che5480-07/Next%Generation%20NGL-LPG(Hudson%20et%20al)-98.pdf, retrieved Nov. 20, 2018.
Pierce, Michael C., et al., 5th Generation NGL/LPG Recovery Technologies for Retrofits, 96th Annual Convention of the GPA Midstream Association, Apr. 11, 2017, San Antonio, Texas.
Honeywell UOP Ortloff, Recycle Split Vapor 2 Process for Retrofits, 2016 UOP LLC, A Honeywell Company, Form PDS-RSV2, Sep. 6, 2019.
Virginillo, Jim, et al., Processing Technology Provides Right-fit Economics for Apache's Alpine High Field Development, The American Oil & Gas Reporter, Editor's Choice, May 2018.
Ortloff Engineers, Ltd., NGL/LPG Recovery—Retro-Flex, 2017
Ortloff Engineers, Ltd., OEL Form PDS-RFX-04, Mar. 27, 2017.

\* cited by examiner

SYSTEM AND METHOD FOR NATURAL GAS LIQUID PRODUCTION WITH FLEXIBLE ETHANE RECOVERY OR REJECTION

BACKGROUND OF THE INVENTION

1. Field of the Invention

This invention relates to a system and method for separation of natural gas liquid (NGL) components from raw natural gas streams that may be operated in ethane recovery or ethane rejection modes, or utilizing certain common equipment and some process flow and operating modifications is capable of being switched between recovery and rejection modes as desired.

2. Description of Related Art

Various NGL extraction techniques are known in the prior art with differing equipment and/or operational requirements depending on whether the operator wants to recover or reject ethane in the NGL product stream. The economics associated with ethane in NGL product streams have varied over time and by geographic location. Most facilities in operation today operate in rejection mode because an operator could lose up to $0.10 for each gallon of ethane in the NGL product stream. This adds up to significant revenue loss, making it desirable to improve upon rejection methods to reduce the amount of ethane in the NGL product stream. For other facilities, or if the economics of ethane change, it may be desirable to operate in recovery mode.

A prior art system and method for rejecting ethane are described in U.S. Pat. No. 5,799,507. The '507 patent allows for very little ethane in the NGL product stream and around 94% propane recovery in the NGL product stream. The '507 patent utilizes two separators and one fractionation column, compared to two fractionation columns in other prior art rejection systems. The '507 patent is able to reduce the equipment requirements by withdrawing a side stream from the fractionation column, cooling it through heat exchange with the fractionation column overhead stream, and then using it as the feed stream for the second separator.

A prior art system and method for ethane recovery are described in U.S. Pat. No. 6,182,469. The '469 patent utilizes one separator, one absorber tower and one stripper tower, with a modified reboiler system where a portion of the down-flowing liquid from the stripper tower is withdrawn and warmed through heat exchange with the inlet feed stream before being returned to a lower stage than from which it was withdrawn, to achieve around 84% ethane recovery in the NGL product stream. The '469 patent also discloses an ethane recovery system using a residue gas recycle stream with one separator and one tower (similar to U.S. Pat. No. 5,568,737 described below), but does not indicate the amount of ethane recovery achievable with that configuration.

Another prior art system and method that allows for operation in either ethane recovery mode (as shown in FIGS. 4-7) or ethane rejection mode (as shown in FIG. 8) is described in U.S. Pat. No. 5,568,737. The 737 patent allow use of the same primary equipment (one separator and one fractionation tower) for either mode with some changes in process stream flows and operating conditions. Ethane recovery mode, which can recover 97-98% of the ethane from the feed stream, requires more heat exchangers than rejection mode. Rejection mode can achieve molar ratios of 0.025:1 ethane to propane.

There is still a need for a system and method that can more efficiently reject or recover ethane in the NGL product stream, reduce energy and equipment requirements, and that is capable of operating in either mode with slight modifications to the process flows and operating conditions.

SUMMARY OF THE INVENTION

Systems and methods disclosed herein facilitate the economically efficient rejection or retention of ethane in NGL product streams, depending on the applicable limits on the amount of ethane acceptable in the NGL product and the economics of ethane recovery, which fluctuate over time and by geographic location, and maximize recovery of propane and heavier hydrocarbons in the NGL product stream. Ethane retention (or recovery) mode refers to processing natural gas stream to maximize the amount of ethane recovered from the feed stream in the NGL product stream, while still maximizing the amount of propane and heavier hydrocarbons in the NGL product stream. Ethane rejection mode refers to processing natural gas stream to minimize the amount of ethane recovered from the feed stream in the NGL product stream, while still maximizing the amount of propane and heavier hydrocarbons in the NGL product stream.

In ethane rejection mode, a typical prior art system and method will primarily include two separators, a pump, a fractionation tower, and at least two primary heat exchangers. Although prior art systems without the second separator can operate in ethane rejection mode, they are less efficient and result in higher amounts of ethane in the NGL product stream. The two separator prior art systems, such as FIGS. 4-6 in U.S. Pat. No. 5,799,507, typically involve cooling a natural gas feed stream prior to feeding the first separator through heat exchange with a first separator bottoms stream and a pre-combined fractionating tower overhead stream and second separator overhead stream. The first separator overhead and bottoms streams are feed streams into the fractionation tower. The second separator bottoms stream is another feed stream into the fractionation tower. The fractionation tower bottoms stream is the NGL product stream. The fractionation tower and second separator overhead streams are the residue gas product stream (containing primarily methane). A side stream is also withdrawn from a mid-point in the fractionation tower, which is cooled by heat exchange with the tower overhead stream (upstream of heat exchange with the feed stream and upstream of combining the tower overhead and second separator overhead stream), prior to feeding into the second separator.

According to one preferred embodiment of the invention, a preferred system and method modify prior art systems and methods for operating in ethane rejection mode by altering the heat exchange systems used in the prior art to increase propane recovery, minimize ethane recovery to less than 15% and more preferably less than 10%. Most preferably, the feed stream under goes heat exchange with a first separator bottoms stream and a pre-combined fractionating tower overhead stream and second separator overhead stream in a first heat exchanger prior to feeding the first separator, as in the prior art; however, there are several preferred differences. First, there are preferably two heat exchanges between the feed stream and the first separator bottoms stream, the second being in a second heat exchanger downstream (relative to the feed stream) from the first heat exchanger. Second, the first separator bottoms stream is preferably expanded through an expansion valve, cooling it prior to passing through the second heat exchanger. Third, the feed stream is first split upstream of the first heat exchanger increase the efficiency of heat transfer.

According to another preferred embodiment of the invention for operating in ethane rejection mode by altering the heat exchange systems used in the prior art, a side stream withdrawn from a midpoint in the fractionation tower passes through a third heat exchanger prior to feeding into the second separator. The side stream is cooled through heat exchange with a combined fractionation tower overhead stream and second separator overhead stream, upstream of this combined stream passing through the first heat exchanger. According to yet another preferred embodiment of the invention for operating in ethane rejection mode by altering the heat exchange systems used in the prior art, the side stream withdrawn from the fractionation tower is cooled with an external refrigeration heat exchanger upstream of the third heat exchanger. According to yet another preferred embodiment of the invention, an additional side stream is withdrawn from a midpoint on the fractionation tower and passes through the first heat exchanger to warm the stream before returning to the fractionation tower at a lower tray location than its withdrawal point.

In ethane retention mode, a typical prior art system and method will primarily include one separator, a fractionation tower, a recycled portion of the residue gas stream, and multiple primary heat exchangers. These prior art systems, such as FIG. 4 in U.S. Pat. No. 5,568,737, typically involve cooling a natural gas feed stream through heat exchange with a portion of the fractionating tower overhead stream and at least two side streams withdrawn from a lower portion of the fractionation tower, which are returned to the tower at a tray location lower than the withdrawal location in a modified reboiler scheme. After cooling, the feed stream feeds into the separator. The separator overhead and bottoms streams are feed streams into the fractionation tower. Part of the separator overhead and bottoms streams undergo heat exchange with the fractionation tower overhead stream (upstream of heat exchange with the feed stream) and with the recycled portion of the residue gas stream upstream of feeding the fractionation tower. The recycled portion of the residue gas stream also undergoes heat exchange with the other portion of the fractionation tower overhead stream (that part that does not undergo heat exchange with the feed stream) downstream of heat exchange with the separator streams. After the two heat exchanges, the recycled portion of the residue gas stream also feeds into the top of the fractionation tower.

According to one preferred embodiment of the invention, a preferred system and method modify prior art systems and methods for operating in ethane retention mode by altering the heat exchange systems used in the prior art to increase propane recovery, maximize ethane recovery to greater than 98% with propane recovery preferably greater than 99.9%. Most preferably, the feed stream under goes heat exchange with a fractionating tower overhead stream and a side stream withdrawn from the bottom portion of the fractionation tower, similar to the prior art; however, there are several preferred differences. First, the feed stream is first split upstream of the first heat exchanger, with a first portion of the feed stream passing through the first heat exchanger and a second portion passing through a heat exchanger acting as a reboiler for the fractionation column and then through an external refrigeration heat exchanger. The two portions are recombined prior to feeding into the separator. Second, the entire fractionation column overhead stream passes through the first heat exchanger. Third, the recycled portion of the residue gas stream also passes through the first heat exchanger.

According to another preferred embodiment, preferred systems of the invention for operating in ethane rejection or retention mode can built as a single system or as stand-alone systems. As a single system, certain equipment (such as the second separator and pump) would be used or bypassed and other process flow modifications would be made if it is desired to operate in one mode vs. the other mode, as will be understood by those of ordinary skill in the art Additionally, an existing system according to a preferred embodiment of the invention or the prior art for operating in ethane rejection or retention mode could easily be modified and adapted to switch to the other mode, if desired, by making process flow modifications and adding or bypassing certain equipment.

Preferred systems and methods of the invention are useful in either maximizing or minimizing ethane recovery, as desired, while also maximizing recovery of propane and heavier constituents. Through efficient use of heat exchange systems, capital costs and operating costs are reduced. Through efficient use of components common between ethane rejection and retention modes, the systems are flexible in allowing modification and adaption to different operating modes as needs change.

BRIEF DESCRIPTION OF THE DRAWINGS

Systems and methods of preferred embodiments of the invention are further described and explained in relation to the following drawings wherein.

DESCRIPTION OF THE PREFERRED EMBODIMENTS

Example 1—Ethane Rejection without External Refrigeration

Figure 1:
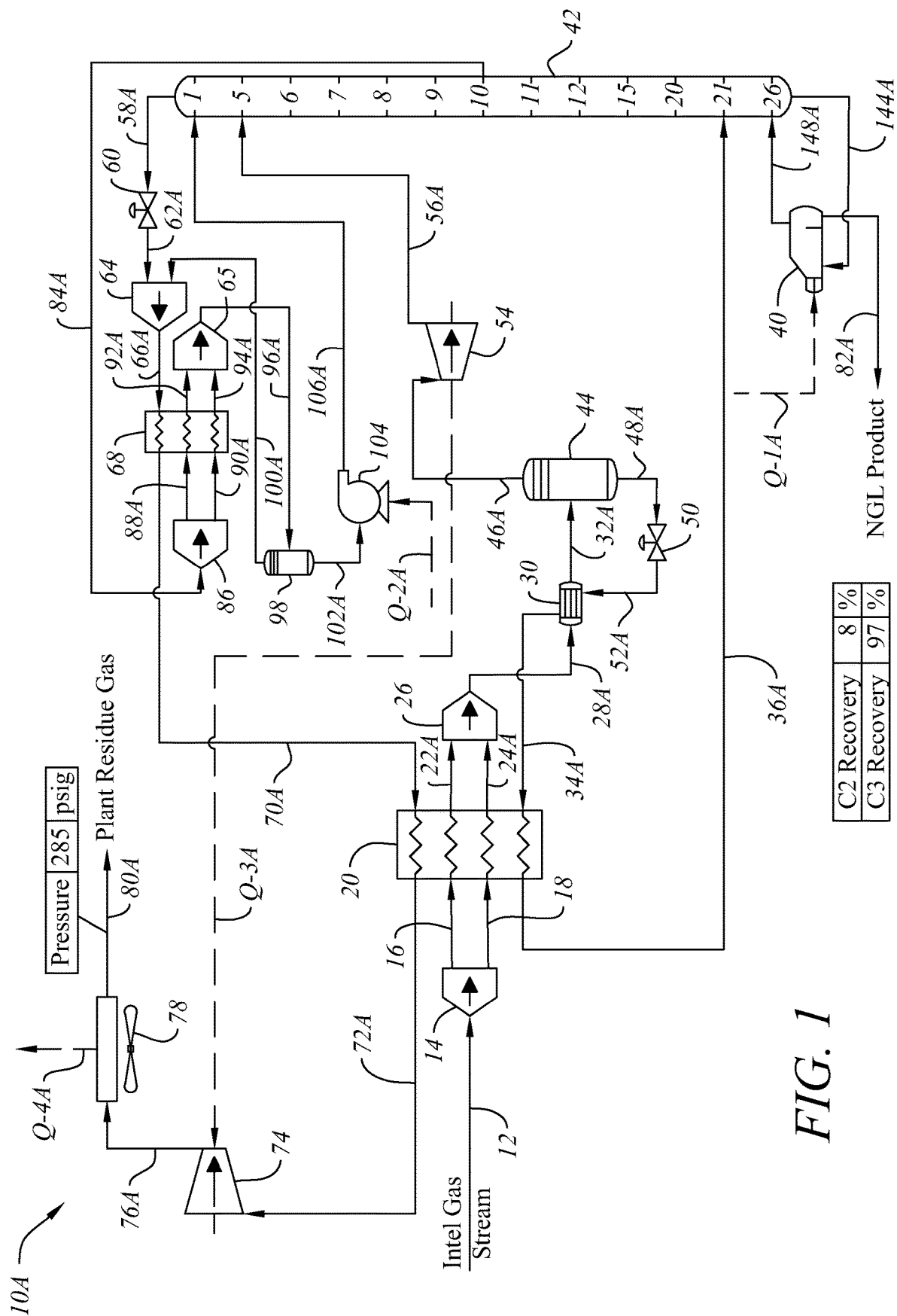
FIG. 1 is a process flow diagram illustrating principal processing stages for producing an NGL product stream in ethane rejection mode and without external refrigeration according to a preferred embodiment of the invention.

Referring to FIG. 1, a preferred embodiment of system 10A for processing NGL product streams in an ethane rejection mode is shown. System 10A preferably comprises three heat exchangers 20, 30, and 68, a first separator 44, a second separator 98, and a fractionating tower 42.

Feed stream 12 comprises natural gas that has already been processed according to known methods to remove excessive amounts of $H_2S$, $CO_2$ (as needed), and water. For the particular Example 1 described herein, feed stream 12 has the following basic parameters: (1) Pressure of near 975 PSIG; (2) Inlet temperature of near 120° F.; (3) Inlet gas flow of 100 Million Standard Cubic Feet per Day (MMSCFD);

(4) Inlet nitrogen content of 2% by volume; (5) inlet $CO_2$ content of 1.725% by volume; (6) inlet methane content of 69.51% by volume; (7) inlet ethane content of 14.8% by volume; and (8) inlet propane content of 7.41% by volume. The parameters of other streams described herein are exemplary based on the data for feed stream 12 used in a computer simulation for Example 1. The temperatures, pressures, flow rates, and compositions of other process streams in system 10A will vary depending on the nature of the feed stream and other operational parameters, as will be understood by those of ordinary skill in the art. Feed stream 12 is preferably directed to the inlet splitter 14 where the inlet gas is strategically split into two streams 16, 18 before passing through heat exchanger 20 and exiting as streams 22A, 24A having been cooled to around 31.4° F. The split between streams 16 and 18 is most preferably 50/50, as in Examples 1-2, but other ratios may also be used. Feed streams 22A, 24A are then recombined in mixer 26 to form stream 28A, which passes through heat exchanger 30, exiting as stream 32A having been cooled to around 13° F. Stream 32A is the feed stream for first separator 44.

First separator overhead stream 46A, containing around 77.5% methane, around 12.67% ethane, and around 4.33% propane at 12.86° F. and 962.8 psig, is expanded in expander 54, exiting as stream 56A. Stream 56A, at around −84° F. and 209.3 psig, is fed into fractionating column 42 near a top section of the tower as a fractionating tower feed stream.

First separator bottoms stream 48A, containing around 40% methane, around 22.6% ethane, and around 18.6% propane at 12.9° F. and 962.8 psig, passes through an expansion valve, exiting as stream 52A at −38.4° F. and 218.7 psig. Stream 52A then passes through heat exchanger 30, exiting as stream 34A, having been warmed to around 20.6° F. Stream 34A then passes through the heat exchanger 20, exiting as stream 36A warmed to 100° F. In this way, the bottoms stream from separator 44 undergoes two stages of heat exchange with the feed stream—once (as stream 52) in heat exchanger 30 (with feed stream 28A) and again (as stream 34) in heat exchanger 20 (with feed streams 16, 18, and along with a combined stream 70A formed by the fractionation column and second separator overhead streams). Stream 36A is then fed into a lower section of fractionating tower 42 as another fractionating tower feed stream.

A stream 84A is withdrawn from fractionating tower 42 from a mid-section of the tower. Stream 84A, containing around 34.1% methane, around 56.96% ethane, and around 6.19% propane at −5.8° F. and 207.4 psig, is split in splitter 86 into streams 88A and 90A. Most preferably stream 84A is split 50/50, but other ratios may also be used. Streams 88A and 90A pass through heat exchanger 68, exiting as streams 92A, 94A having been cooled to around −89.5° F. Streams 92A, 94A are then recombined in mixer 65 to form stream 96A, which feeds into second separator 98.

Second separator bottoms stream 102A, containing around 21.6% methane, around 68% ethane, and around 7.8% propane at −89.9° F. and 199.9 psig, is preferably pumped with pump 104, exiting pump 104 as stream 106A at a pressure of 224.9 psig. Stream 106A is another feed stream into the top of fractionating tower 42.

Second separator overhead stream 100A contains around 79.3% methane, around 17% ethane, and around 0.27% propane at −89.9° F. and 199.9 psig. Fractionating tower overhead stream 58A contains around 1.98% $CO_2$, around 2.3% nitrogen, around 79.8% methane, around 15.6% ethane, and around 0.263% propane at −91.8° F. and 206.32 psig. Stream 58A is expanded through expansion valve 60, exiting as stream 62A at −93.4° F. and 196.32 psig. These two overhead streams 62A and 100A are combined in mixer 64 forming stream 66A, which passes through heat exchanger 68, exiting as stream 70A having been warmed to around −11.9° F. Stream 70A then passes through heat exchanger 20, exiting as stream 72A having been warmed to around 110.8° F. Stream 72A is compressed in compressor 74 (preferably receiving energy Q-3 from expander 54), exiting as stream 76A. Stream 76A is preferably cooled in heat exchanger 78 to form residue gas stream 80A, containing around 1.97% $CO_2$, around 2.27% nitrogen, around 79.8% methane, around 15.69% ethane, and around 0.26% propane at 120° F. and 285.2 psig.

A liquid stream 144A is withdrawn from the bottom of fractionating tower 42, passing through reboiler 40, with vapor stream 148A being returned to tower 42 and fractionating tower bottoms stream 82A exiting as the NGL product stream. Stream 82A contains negligible nitrogen, 0.05% $CO_2$, 0.017% methane, 8.9% ethane, and 55.6% propane. The ethane recovery in NGL product stream 82A from the feed stream is 8% and the propane recovery in stream 82A is 97%.

The flow rates, temperatures and pressures of various flow streams referred to in connection with Example 1 of a preferred system and method of the invention in relation to FIG. 1, are based on a computer simulation for system 10A having the feed stream characteristics discussed above and listed below in Table 1, with a preferred maximum $CO_2$ feed stream content. System 10A may be operated with up to 1.725% $CO_2$ in feed stream 12 without encountering freezing problems typically encountered in prior art systems and while still meeting a 2% maximum $CO_2$ content in the residue gas specification. This allows system 10A to be operated without pretreating the feed stream to remove $CO_2$ or with reduced pretreatment requirements. The flow rates, temperatures and pressures of various flow streams in system 10A based on a computer simulation of Example 1 using a feed stream having 1.725% $CO_2$ (and other feed stream content/parameters noted below) are included in Tables 1 and 2 below. These temperatures, pressures, flow rates, and compositions will also vary depending on the nature of other parameters in the feed stream and other operational parameters as will be understood by those of ordinary skill in the art. References to "neg" mean negligible amounts.

TABLE 1

Example 1, System 10A - Rejection Mode without External Refrigeration

| | | Stream Properties | | | | |
|---|---|---|---|---|---|---|
| Property | Units | 12 | 16 | 18 | 22a | 24A |
| Temperature | ° F. | 120* | 120 | 120 | 31.4043* | 31.4043* |
| Pressure | psig | 975.257* | 975.257 | 975.257 | 970.257 | 970.257 |
| Molar Flow | lbmol/h | 10979.8 | 5489.91 | 5489.91 | 5489.91 | 5489.91 |

TABLE 1-continued

Example 1, System 10A - Rejection Mode without External Refrigeration

| | | | | | | |
|---|---|---|---|---|---|---|
| Mole Fraction Vapor | % | 100 | 100 | 100 | 85.7573 | 85.7573 |
| Mole Fraction Light Liquid | % | 0 | 0 | 0 | 14.2427 | 14.2427 |

Stream Composition

| Mole Fraction | 12 % | 16 % | 18 % | 22a % | 24A % |
|---|---|---|---|---|---|
| CO2 | 1.725* | 1.725 | 1.725 | 1.725 | 1.725 |
| N2 | 1.97538* | 1.97538 | 1.97538 | 1.97538 | 1.97538 |
| C1 | 69.5086* | 69.5086 | 69.5086 | 69.5086 | 69.5086 |
| C2 | 14.8153* | 14.8153 | 14.8153 | 14.8153 | 14.8153 |
| C3 | 7.40766* | 7.40766 | 7.40766 | 7.40766 | 7.40766 |
| iC4 | 0.987688* | 0.987688 | 0.987688 | 0.987688 | 0.987688 |
| nC4 | 2.29638* | 2.29638 | 2.29638 | 2.29638 | 2.29638 |
| iC5 | 0.493844* | 0.493844 | 0.493844 | 0.493844 | 0.493844 |
| nC5 | 0.592613* | 0.592613 | 0.592613 | 0.592613 | 0.592613 |
| C6 | 0.197538* | 0.197538 | 0.197538 | 0.197538 | 0.197538 |

Stream Properties

| Property | Units | 28A | 32A | 34A | 36A | 46A |
|---|---|---|---|---|---|---|
| Temperature | °F. | 31.4043 | 13* | 20.5789 | 100* | 12.8649 |
| Pressure | psig | 970.257 | 965.257 | 213.72 | 212.72 | 962.757 |
| Molar Flow | lbmol/h | 10979.8 | 10979.8 | 2366.83 | 2366.83 | 8612.99 |
| Mole Fraction Vapor | % | 85.7573 | 78.4427 | 63.7722 | 94.8245 | 100 |
| Mole Fraction Light Liquid | % | 14.2427 | 21.5573 | 36.2278 | 5.17548 | 0 |

Stream Composition

| Mole Fraction | 28A % | 32A % | 34A % | 36A % | 46A % |
|---|---|---|---|---|---|
| CO2 | 1.725 | 1.725 | 1.72385 | 1.72385 | 1.72532 |
| N2 | 1.97538 | 1.97538 | 0.534224 | 0.534224 | 2.3714 |
| C1 | 69.5086 | 69.5086 | 40.272 | 40.272 | 77.5427 |
| C2 | 14.8153 | 14.8153 | 22.6236 | 22.6236 | 12.6696 |
| C3 | 7.40766 | 7.40766 | 18.6049 | 18.6049 | 4.33069 |
| iC4 | 0.987688 | 0.987688 | 3.17365 | 3.17365 | 0.386991 |
| nC4 | 2.29638 | 2.29638 | 7.88993 | 7.88993 | 0.759281 |
| iC5 | 0.493844 | 0.493844 | 1.93769 | 1.93769 | 0.097078 |
| nC5 | 0.592613 | 0.592613 | 2.37602 | 2.37602 | 0.102538 |
| C6 | 0.197538 | 0.197538 | 0.864175 | 0.864175 | 0.014347 |

Stream Properties

| Property | Units | 48A | 52A | 56A | 58A | 62A |
|---|---|---|---|---|---|---|
| Temperature | °F. | 12.8649 | −38.3593 | −84.3357 | −91.8271 | −93.3772 |
| Pressure | psig | 962.757 | 218.72* | 209.3* | 206.32 | 196.32 |
| Molar Flow | lbmol/h | 2366.83 | 2366.83 | 8612.99 | 9230.07 | 9230.07 |
| Mole Fraction Vapor | % | 0 | 42.6237 | 88.6443 | 100 | 100 |
| Mole Fraction Light Liquid | % | 100 | 57.3763 | 11.3557 | 0 | 0 |

Stream Composition

| Mole Fraction | 48A % | 52A % | 56A % | 58A % | 62A % |
|---|---|---|---|---|---|
| CO2 | 1.72385 | 1.72385 | 1.72532 | 1.98165 | 1.98165 |
| N2 | 0.534224 | 0.534224 | 2.3714 | 2.29203 | 2.29203 |
| C1 | 40.272 | 40.272 | 77.5427 | 79.8173 | 79.8173 |
| C2 | 22.6236 | 22.6236 | 12.6696 | 15.6422 | 15.6422 |
| C3 | 18.6049 | 18.6049 | 4.33069 | 0.264576 | 0.264576 |
| iC4 | 3.17365 | 3.17365 | 0.386991 | 0.001080 | 0.001080 |
| nC4 | 7.88993 | 7.88993 | 0.759281 | 0.001217 | 0.001217 |
| iC5 | 1.93769 | 1.93769 | 0.097078 | Neg | Neg |
| nC5 | 2.37602 | 2.37602 | 0.102538 | Neg | Neg |
| C6 | 0.864175 | 0.864175 | 0.014347 | Neg | Neg |

Stream Properties

| Property | Units | 66A | 70A | 72A | 76A | 80A |
|---|---|---|---|---|---|---|
| Temperature | °F. | −93.2767 | −11.9376 | 110.824 | 181.314 | 120* |
| Pressure | psig | 196.32 | 191.32 | 186.32 | 290.228 | 285.228 |

TABLE 1-continued

Example 1, System 10A - Rejection Mode without External Refrigeration

| | | | | | | |
|---|---|---|---|---|---|---|
| Molar Flow | lbmol/h | 9563.34 | 9563.34 | 9563.34 | 9563.34 | 9563.34 |
| Mole Fraction Vapor | % | 100 | 100 | 100 | 100 | 100 |
| Mole Fraction Light Liquid | % | 0 | 0 | 0 | 0 | 0 |

Stream Composition

| Mole Fraction | 66A % | 70A % | 72A % | 76A % | 80A % |
|---|---|---|---|---|---|
| $CO_2$ | 1.97326 | 1.97326 | 1.97326 | 1.97326 | 1.97326 |
| $N_2$ | 2.26796 | 2.26796 | 2.26796 | 2.26796 | 2.26796 |
| C1 | 79.8015 | 79.8015 | 79.8015 | 79.8015 | 79.8015 |
| C2 | 15.69 | 15.69 | 15.69 | 15.69 | 15.69 |
| C3 | 0.265 | 0.265 | 0.265 | 0.265 | 0.265 |
| iC4 | 0.001082 | 0.001082 | 0.001082 | 0.001082 | 0.001082 |
| nC4 | 0.001220 | 0.001220 | 0.001220 | 0.001220 | 0.001220 |
| iC5 | Neg | Neg | Neg | Neg | Neg |
| nC5 | Neg | Neg | Neg | Neg | Neg |
| C6 | Neg | Neg | Neg | Neg | Neg |

Stream Properties

| Property | Units | 82A | 84A | 88A | 90A | 92A |
|---|---|---|---|---|---|---|
| Temperature | ° F. | 122.929 | −5.78509 | −5.78509 | −5.78509 | −89.5251* |
| Pressure | psig | 210.82 | 207.4 | 207.4 | 207.4 | 202.4 |
| Molar Flow | lbmol/h | 1416.49 | 1537.18 | 768.588 | 768.588 | 768.588 |
| Mole Fraction Vapor | % | 0 | 100 | 100 | 100 | 21.4649 |
| Mole Fraction Light Liquid | % | 100 | 0 | 0 | 0 | 78.5351 |

Stream Composition

| Mole Fraction | 82A % | 84A % | 88A % | 90A % | 92A % |
|---|---|---|---|---|---|
| $CO_2$ | 0.048869 | 2.01951 | 2.01951 | 2.01951 | 2.01951 |
| $N_2$ | Neg | 0.415043 | 0.415043 | 0.415043 | 0.415043 |
| C1 | 0.016567 | 34.0876 | 34.0876 | 34.0876 | 34.0876 |
| C2 | 8.90998 | 56.9581 | 56.9581 | 56.9581 | 56.9581 |
| C3 | 55.6312 | 6.18507 | 6.18507 | 6.18507 | 6.18507 |
| iC4 | 7.64871 | 0.131199 | 0.131199 | 0.131199 | 0.131199 |
| nC4 | 17.792 | 0.188893 | 0.188893 | 0.188893 | 0.188893 |
| iC5 | 3.82794 | 0.008024 | 0.008024 | 0.008024 | 0.008024 |
| nC5 | 4.59357 | 0.006397 | 0.006397 | 0.006397 | 0.006397 |
| C6 | 1.5312 | 0.000167 | 0.000167 | 0.000167 | 0.000167 |

Stream Properties

| Property | Units | 94A | 96A | 100A | 102A | 106A |
|---|---|---|---|---|---|---|
| Temperature | ° F. | −89.5251* | −89.5251 | −89.9471 | −89.9471 | −89.6931 |
| Pressure | psig | 202.4 | 202.4 | 199.9 | 199.9 | 224.9 |
| Molar Flow | lbmol/h | 768.588 | 1537.18 | 333.27 | 1203.91 | 1203.91 |
| Mole Fraction Vapor | % | 21.4649 | 21.4649 | 100 | 0 | 0 |
| Mole Fraction Light Liquid | % | 78.5351 | 78.5351 | 0 | 100 | 100 |

Stream Composition

| Mole Fraction | 94A % | 96A % | 100A % | 102A % | 106A % |
|---|---|---|---|---|---|
| $CO_2$ | 2.01951 | 2.01951 | 1.74097 | 2.09661 | 2.09661 |
| $N_2$ | 0.415043 | 0.415043 | 1.6013 | 0.086659 | 0.086659 |
| C1 | 34.0876 | 34.0876 | 79.3641 | 21.554 | 21.554 |
| C2 | 56.9581 | 56.9581 | 17.0144 | 68.0155 | 68.0155 |
| C3 | 6.18507 | 6.18507 | 0.276723 | 7.82065 | 7.82065 |
| iC4 | 0.131199 | 0.131199 | 0.001160 | 0.167197 | 0.167197 |
| nC4 | 0.188893 | 0.188893 | 0.001311 | 0.24082 | 0.24082 |
| iC5 | 0.008024 | 0.008024 | Neg | 0.010243 | 0.010243 |
| nC5 | 0.006397 | 0.006397 | Neg | 0.008167 | 0.008167 |
| C6 | 0.000167 | 0.000167 | Neg | 0.000214 | 0.000214 |

TABLE 1-continued

Example 1, System 10A - Rejection Mode without External Refrigeration

Stream Properties

| Property | Units | 144A | 148A |
|---|---|---|---|
| Temperature | °F. | 107.742 | 122.929 |
| Pressure | psig | 210.82 | 210.82 |
| Molar Flow | lbmol/h | 1993.57 | 577.081 |
| Mole Fraction Vapor | % | 0 | 100 |
| Mole Fraction Light Liquid | % | 100 | 0 |

Stream Composition

| Mole Fraction | 144A % | 148A % |
|---|---|---|
| CO2 | 0.112279 | 0.267921 |
| N2 | Neg | Neg |
| C1 | 0.059564 | 0.165105 |
| C2 | 13.3865 | 24.3744 |
| C3 | 57.2242 | 61.1345 |
| iC4 | 6.70408 | 4.38544 |
| nC4 | 14.8899 | 7.76634 |
| iC5 | 2.97541 | 0.882816 |
| nC5 | 3.52681 | 0.908379 |
| C6 | 1.12128 | 0.115109 |

TABLE 2

Example 1, System 10A Energy Streams - Maximum $CO_2$ Content

| Energy Stream | Energy Rate (MBTU/h) | Power (hp) | From Block | To Block |
|---|---|---|---|---|
| Q-1A | 4077.77 | — | — | Reboiler 40 |
| Q-2A | 6.798 | — | — | Pump 104 |
| Q-3A | 6218.61 | 2444 | Expander 54 | Compressor 74 |
| Q-4A | 5950.59 | — | Heat Exchanger/ Cooler 78 | — |

It will be appreciated by those of ordinary skill in the art that the values in the Tables are based on the particular parameters and composition of the feed stream in the above examples. The values will differ depending on the parameters and composition of the feed stream 12 and operational parameters for system 10A as will be understood by those of ordinary skill in the art.

Example 2—Ethane Rejection with External Refrigeration

Figure 2:
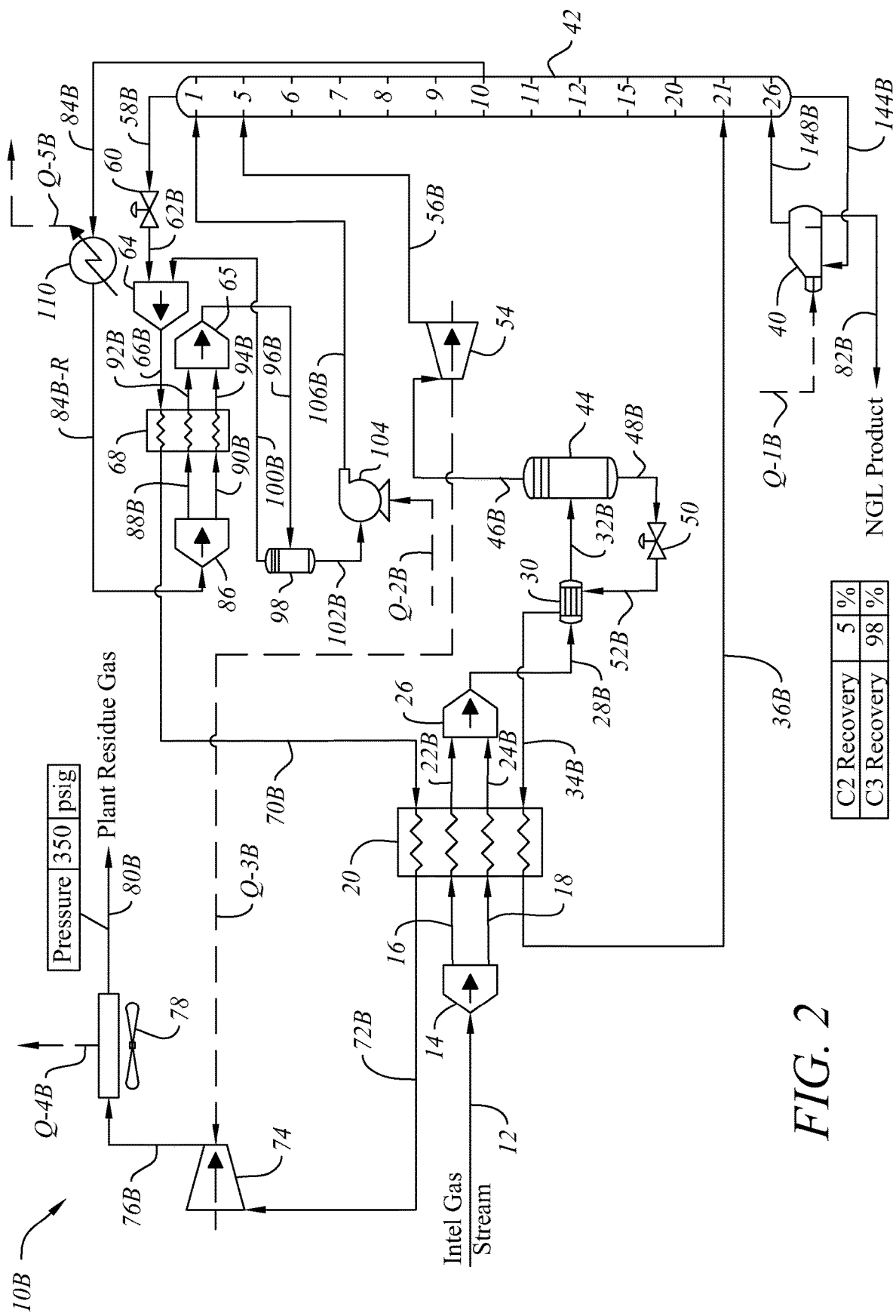
FIG. 2 is a process flow diagram illustrating principal processing stages for producing an NGL product stream in ethane rejection mode and with external refrigeration according to another preferred embodiment of the invention.

Referring to FIG. 2, system 10B for processing NGL product streams in an ethane rejection mode according to another preferred embodiment is shown. System 10B preferably comprises heat exchangers 20, 30, and 68, a first separator 44, a second separator 98, and a fractionating tower 42, just as in system 10A. The equipment and stream flows from one piece of equipment to another in system 10B are the same as with system 10A except that system 10B includes an additional heat exchanger 110 that provides external refrigeration to stream 84B (a side stream withdrawn from a mid-point in tower 42) prior to passing through heat exchanger 68. In system 10B, stream 84B is withdrawn from a mid-point in fractionation tower 42 and contains 34.5% methane, 59.1% ethane, and 3.7% propane at −0.17° F. and 275.97 psig, based on the parameters and content of feed stream 12 for Example 2, as indicated in Tables 3-4 below. Stream 84B passes through heat exchanger/external refrigeration 110, exiting as stream 84B-R having been cooled to −30° F. Stream 84B-R is then split into streams 88B, 90B in splitter 86 before passing through heat exchanger 68, as in system 10A. Most preferably stream 84B-R is split 50/50, but other ratios may also be used.

The temperatures, pressures, and compositional makeup of the streams and operating parameters of the equipment in system 10B (other than the initial feed streams 12, 16, 18) will differ from system 10A because of the addition of the external refrigeration as will be understood by those of ordinary skill in the art. For example, tower 42 in system 10B will operate at higher pressures than with system 10A and the bottoms stream from separator 98 that feeds into the top of tower 42 in system 10B (stream 106B) will have a higher methane content and lower ethane content than the same stream (106A) in system 10A. There are additional operating and equipment costs associated with system 10B compared with system 10A, but the ethane recovery in the NGL product stream is better (lower) than in system 10A and the propane recovery is slightly higher. In addition, the residue gas exits 10B at a higher pressure allowing for less compression to be utilized to compress the treated gas for introduction into typical natural gas transmission pipelines. The ethane recovery in NGL product stream 40B from the feed stream is 5% and the propane recovery in stream 40B is 98% in Example 2. When it is desirable to reject ethane, typical NGL specifications limit ethane retention from the feed to between 5-15% to meet other specifications. Systems 10A and 10B both meet these requirements, but system 10B retains less ethane (5% in Example 2) than system 10A (8% in Example 1).

The flow rates, temperatures and pressures of various flow streams referred to in connection with Example 2 of a preferred system and method of the invention in relation to FIG. 2, are based on a computer simulation for system 10B having the feed stream characteristics discussed above and listed below in Table 3, with a preferred maximum $CO_2$ feed stream content. System 10B may be operated with up to 1.725% $CO_2$ in feed stream 12 without encountering freezing problems typically encountered in prior art systems and while still meeting a 2% maximum $CO_2$ content in the residue gas specification. This allows system 10B to be operated without pretreating the feed stream to remove $CO_2$ or with reduced pretreatment requirements. The flow rates, temperatures and pressures of various flow streams in system 10B based on a computer simulation of Example 2 using a feed stream having 1.725% $CO_2$ (and other feed stream content/parameters noted below) are included in Tables 3 and 4 below. These temperatures, pressures, flow rates, and compositions will also vary depending on the nature of other parameters in the feed stream and other operational parameters as will be understood by those of ordinary skill in the art.

TABLE 3

Example 2, System 10B - Rejection Mode with External Refrig.

Stream Properties

| Property | Units | 12 | 16 | 18 | 22B | 24B |
|---|---|---|---|---|---|---|
| Temperature | ° F. | 120* | 120 | 120 | 21.4342* | 21.4342* |
| Pressure | psig | 975.257* | 975.257 | 975.257 | 970.257 | 970.257 |
| Molar Flow | lbmol/h | 10979.8 | 5489.91 | 5489.91 | 5489.91 | 5489.91 |
| Mole Fraction Vapor | % | 100 | 100 | 100 | 81.9067 | 81.9067 |
| Mole Fraction Light Liquid | % | 0 | 0 | 0 | 18.0933 | 18.0933 |

Stream Composition

| Mole Fraction | 12 % | 16 % | 18 % | 22B % | 24B % |
|---|---|---|---|---|---|
| CO2 | 1.725* | 1.725 | 1.725 | 1.725 | 1.725 |
| N2 | 1.97538* | 1.97538 | 1.97538 | 1.97538 | 1.97538 |
| C1 | 69.5086* | 69.5086 | 69.5086 | 69.5086 | 69.5086 |
| C2 | 14.8153* | 14.8153 | 14.8153 | 14.8153 | 14.8153 |
| C3 | 7.40766* | 7.40766 | 7.40766 | 7.40766 | 7.40766 |
| iC4 | 0.987688* | 0.987688 | 0.987688 | 0.987688 | 0.987688 |
| nC4 | 2.29638* | 2.29638 | 2.29638 | 2.29638 | 2.29638 |
| iC5 | 0.493844* | 0.493844 | 0.493844 | 0.493844 | 0.493844 |
| nC5 | 0.592613* | 0.592613 | 0.592613 | 0.592613 | 0.592613 |
| C6 | 0.197538* | 0.197538 | 0.197538 | 0.197538 | 0.197538 |

Stream Properties

| Property | Units | 28B | 32B | 34B | 36B | 46B |
|---|---|---|---|---|---|---|
| Temperature | ° F. | 21.4342 | 2.5* | 11.8659 | 85* | 2.36321 |
| Pressure | psig | 970.257 | 965.257 | 282.289 | 281.289 | 962.757 |
| Molar Flow | lbmol/h | 10979.8 | 10979.8 | 2908.72 | 2908.72 | 8071.11 |
| Mole Fraction Vapor | % | 81.9067 | 73.4966 | 59.5283 | 87.9487 | 100 |
| Mole Fraction Light Liquid | % | 18.0933 | 26.5034 | 40.4717 | 12.0513 | 0 |

Stream Composition

| Mole Fraction | 28B % | 32B % | 34B % | 36B % | 46B % |
|---|---|---|---|---|---|
| CO2 | 1.725 | 1.725 | 1.80859 | 1.80859 | 1.69487 |
| N2 | 1.97538 | 1.97538 | 0.58266 | 0.58266 | 2.47729 |
| C1 | 69.5086 | 69.5086 | 43.1184 | 43.1184 | 79.0192 |
| C2 | 14.8153 | 14.8153 | 22.7741 | 22.7741 | 11.9471 |
| C3 | 7.40766 | 7.40766 | 17.5076 | 17.5076 | 3.7678 |
| iC4 | 0.987688 | 0.987688 | 2.8493 | 2.8493 | 0.316788 |
| nC4 | 2.29638 | 2.29638 | 6.96576 | 6.96576 | 0.613593 |
| iC5 | 0.493844 | 0.493844 | 1.65789 | 1.65789 | 0.074339 |
| nC5 | 0.592613 | 0.592613 | 2.0192 | 2.0192 | 0.078490 |
| C6 | 0.197538 | 0.197538 | 0.71647 | 0.71647 | 0.010521 |

Stream Properties

| Property | Units | 48B | 52B | 56B | 58B | 62B |
|---|---|---|---|---|---|---|
| Temperature | ° F. | 2.36321 | −42.5725 | −80.119 | −82.5718 | −83.9354 |
| Pressure | psig | 962.757 | 287.289* | 277.869* | 274.889 | 264.889 |
| Molar Flow | lbmol/h | 2908.72 | 2908.72 | 8071.11 | 9259.99 | 9259.99 |
| Mole Fraction Vapor | % | 0 | 39.8756 | 88.8805 | 100 | 99.9658 |
| Mole Fraction Light Liquid | % | 100 | 60.1244 | 11.1195 | 0 | 0.0342231 |

TABLE 3-continued

Example 2, System 10B - Rejection Mode with External Refrig.

Stream Composition

| Mole Fraction | 48B % | 52B % | 56B % | 58B % | 62B % |
|---|---|---|---|---|---|
| CO2 | 1.80859 | 1.80859 | 1.69487 | 1.98114 | 1.98114 |
| N2 | 0.58266 | 0.58266 | 2.47729 | 2.27468 | 2.27468 |
| C1 | 43.1184 | 43.1184 | 79.0192 | 79.5349 | 79.5349 |
| C2 | 22.7741 | 22.7741 | 11.9471 | 16.028 | 16.028 |
| C3 | 17.5076 | 17.5076 | 3.7678 | 0.179253 | 0.179253 |
| iC4 | 2.8493 | 2.8493 | 0.316788 | 0.000898 | 0.000898 |
| nC4 | 6.96576 | 6.96576 | 0.613593 | 0.001099 | 0.001099 |
| iC5 | 1.65789 | 1.65789 | 0.074339 | Neg | Neg |
| nC5 | 2.0192 | 2.0192 | 0.078490 | Neg | Neg |
| C6 | 0.71647 | 0.71647 | 0.010521 | Neg | Neg |

Stream Properties

| Property | Units | 66B | 70B | 72B | 76B | 80B |
|---|---|---|---|---|---|---|
| Temperature | °F. | −83.8091 | −34.2366 | 111.129 | 164.302 | 120* |
| Pressure | psig | 264.889 | 259.889 | 254.889 | 354.998 | 349.998 |
| Molar Flow | lbmol/h | 9599.19 | 9599.19 | 9599.19 | 9599.19 | 9599.19 |
| Mole Fraction Vapor | % | 99.9664 | 100 | 100 | 100 | 100 |
| Mole Fraction Light Liquid | % | 0.0335718 | 0 | 0 | 0 | 0 |

Stream Composition

| Mole Fraction | 66B % | 70B % | 72B % | 76B % | 80B % |
|---|---|---|---|---|---|
| CO2 | 1.972 | 1.972 | 1.972 | 1.972 | 1.972 |
| N2 | 2.25949 | 2.25949 | 2.25949 | 2.25949 | 2.25949 |
| C1 | 79.5055 | 79.5055 | 79.5055 | 79.5055 | 79.5055 |
| C2 | 16.0813 | 16.0813 | 16.0813 | 16.0813 | 16.0813 |
| C3 | 0.179689 | 0.179689 | 0.179689 | 0.179689 | 0.179689 |
| iC4 | 0.000901 | 0.000901 | 0.000901 | 0.000901 | 0.000901 |
| nC4 | 0.001102 | 0.001102 | 0.001102 | 0.001102 | 0.001102 |
| iC5 | Neg | Neg | Neg | Neg | Neg |
| nC5 | Neg | Neg | Neg | Neg | Neg |
| C6 | Neg | Neg | Neg | Neg | Neg |

Stream Properties

| Property | Units | 82B | 84B | 84B-R | 88B | 90B |
|---|---|---|---|---|---|---|
| Temperature | °F. | 155.657 | −0.16483 | −30* | −30 | −30 |
| Pressure | psig | 279.389 | 275.969 | 273.469 | 273.469 | 273.469 |
| Molar Flow | lbmol/h | 1380.65 | 2031.27 | 2031.27 | 1015.63 | 1015.63 |
| Mole Fraction Vapor | % | 0 | 100 | 57.9531 | 57.9531 | 57.9531 |
| Mole Fraction Light Liquid | % | 100 | 0 | 42.0469 | 42.0469 | 42.0469 |

Stream Composition

| Mole Fraction | 82B % | 84B % | 84B-R % | 88B % | 90B % |
|---|---|---|---|---|---|
| CO2 | 0.007705 | 2.08811 | 2.08811 | 2.08811 | 2.08811 |
| N2 | Neg | 0.421425 | 0.421425 | 0.421425 | 0.421425 |
| C1 | 0.003187 | 34.4929 | 34.4929 | 34.4929 | 34.4929 |
| C2 | 6.01175 | 59.0521 | 59.0521 | 59.0521 | 59.0521 |
| C3 | 57.663 | 3.7223 | 3.7223 | 3.7223 | 3.7223 |
| iC4 | 7.84852 | 0.084769 | 0.084769 | 0.084769 | 0.084769 |
| nC4 | 18.2547 | 0.128476 | 0.128476 | 0.128476 | 0.128476 |
| iC5 | 3.92731 | 0.005446 | 0.005446 | 0.005446 | 0.005446 |
| nC5 | 4.71282 | 0.004394 | 0.004394 | 0.004394 | 0.004394 |
| C6 | 1.57095 | 0.000123 | 0.000123 | 0.000123 | 0.000123 |

Stream Properties

| Property | Units | 92B | 94B | 96B | 100b | 102B |
|---|---|---|---|---|---|---|
| Temperature | °F. | −79.9266* | −79.9266* | −79.9266 | −80.2819 | −80.2819 |
| Pressure | psig | 268.469 | 268.469 | 268.469 | 265.969 | 265.969 |
| Molar Flow | lbmol/h | 1015.63 | 1015.63 | 2031.27 | 339.196 | 1692.07 |
| Mole Fraction Vapor | % | 16.4886 | 16.4886 | 16.4886 | 100 | 0 |

TABLE 3-continued

Example 2, System 10B - Rejection Mode with External Refrig.

| | | | | | | |
|---|---|---|---|---|---|---|
| Mole Fraction Light Liquid | % | 83.5114 | 83.5114 | 83.5114 | 0 | 100 |

Stream Composition

| Mole Fraction | 92B % | 94B % | 96B % | 100b % | 102B % |
|---|---|---|---|---|---|
| CO2 | 2.08811 | 2.08811 | 2.08811 | 1.7225 | 2.1614 |
| N2 | 0.421425 | 0.421425 | 0.421425 | 1.8448 | 0.136093 |
| C1 | 34.4929 | 34.4929 | 34.4929 | 78.7018 | 25.6307 |
| C2 | 59.0521 | 59.0521 | 59.0521 | 17.5372 | 67.3743 |
| C3 | 3.7223 | 3.7223 | 3.7223 | 0.191595 | 4.43007 |
| iC4 | 0.084769 | 0.084769 | 0.084769 | 0.000971 | 0.101568 |
| nC4 | 0.128476 | 0.128476 | 0.128476 | 0.001189 | 0.153992 |
| iC5 | 0.005446 | 0.005446 | 0.005446 | Neg | 0.006536 |
| nC5 | 0.004394 | 0.004394 | 0.004394 | Neg | 0.005273 |
| C6 | 0.000123 | 0.000123 | 0.000123 | Neg | 0.000148 |

Stream Properties

| Property | Units | 106B | 144B | 148B |
|---|---|---|---|---|
| Temperature | °F. | −79.9982 | 137.594 | 155.657 |
| Pressure | psig | 290.969 | 279.389 | 279.389 |
| Molar Flow | lbmol/h | 1692.07 | 2748.73 | 1368.08 |
| Mole Fraction Vapor | % | 0 | 0 | 100 |
| Mole Fraction Light Liquid | % | 100 | 100 | 0 |

Stream Composition

| Mole Fraction | 106B % | 144B % | 148B % |
|---|---|---|---|
| CO2 | 2.1614 | 0.0212266 | 0.034872 |
| N2 | 0.136093 | Neg | Neg |
| C1 | 25.6307 | 0.013306 | 0.023517 |
| C2 | 67.3743 | 10.4733 | 14.9759 |
| C3 | 4.43007 | 62.343 | 67.066 |
| iC4 | 0.101568 | 6.58462 | 5.30911 |
| nC4 | 0.153992 | 14.0647 | 9.83618 |
| iC5 | 0.006536 | 2.59052 | 1.24145 |
| nC5 | 0.005273 | 3.02201 | 1.31567 |
| C6 | 0.000148 | 0.887282 | 0.197333 |

TABLE 4

Example 2, System 10B Energy Streams

| Energy Stream | Energy Rate (MBtu/hr) | Power (hp) | From | To |
|---|---|---|---|---|
| Q-1B | 8450.5 | | — | Reboiler 40 |
| Q-2B | 9.605 | | — | Pump 104 |
| Q-3B | 4613.45 | 1360.1 | Expander 54 | Compressor 74 |
| Q-4B | 4340.39 | | Heat Exchanger/Cooler 78 | — |
| Q-5B | 4613.9 | | Heat Exchanger/External Refrigeration 110 | — |

It will be appreciated by those of ordinary skill in the art that the values in the Tables are based on the particular parameters and composition of the feed stream in the above examples. The values will differ depending on the parameters and composition of the feed stream 12 and operational parameters for system 10B as will be understood by those of ordinary skill in the art.

Figure 4:
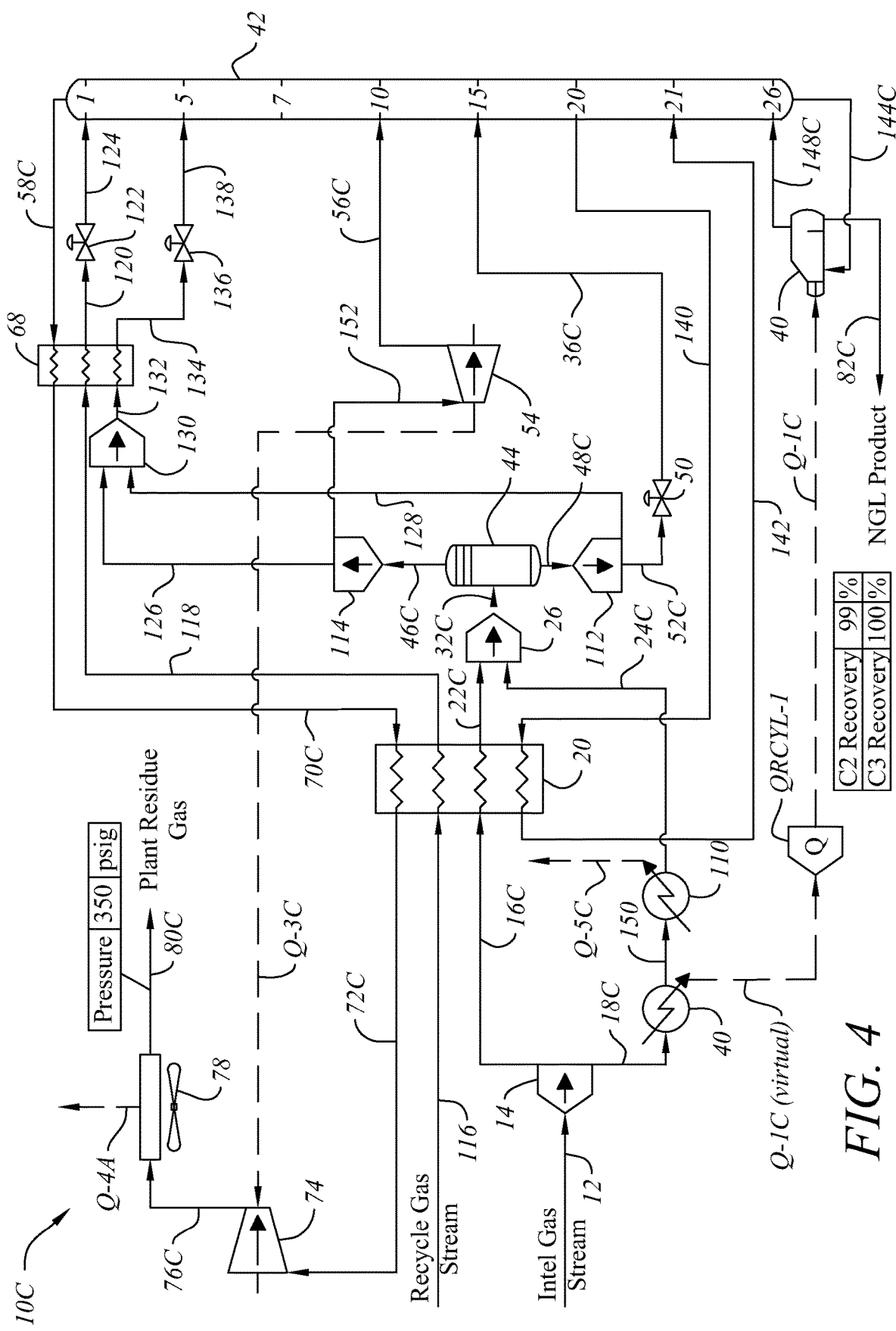
FIG. 4 is a process flow diagram illustrating principal processing stages for producing an NGL product stream in ethane retention mode according to another preferred embodiment of the invention.

Systems 10A and 10B are similar to FIG. 4 in U.S. Pat. No. 5,799,507. One important difference between systems 10A and 10B and the system depicted in FIG. 4 of the '507 patent is that the heat exchange systems are different, including the use of external refrigeration in system 10B, which is not used in FIG. 4 of the '507 patent. In systems 10A and 10B, feed stream 12 is split with each part of the feed stream (streams 16 and 18) passing through heat exchanger 20 (upstream of heat exchanger 30) with the mixed fractionation tower overhead stream and second separator overhead stream 70A/70B (downstream of heat exchanger 68) and first separator bottoms stream 34A/34B (downstream of heat exchanger 30). In the '507 patent, the feed stream is not split and the first bottoms stream is not warmed prior to heat exchange with the feed stream and mixed fractionation tower overhead stream and second separator bottoms stream. By passing the first separator bottoms stream through heat exchangers 30 and 20, it is possible to warm that stream sufficiently that it feeds into fractionation tower 42 (as stream 36A/36B) at a higher temperature (up to 110° F., depending on the inlet gas composition and operating conditions, although that stream may also feed into fractionation tower 42 at temperatures in the range of 25° F. to 110° F.) than the 65° F. of stream 33b in the '507 patent. This makes it possible to operate fractionation tower 42 with minimal external heat input which in turn allows for a greater efficiency overall. It also allows the feed stream into first separator 44 (streams 32A/32B) to be warmer (in the range of −25° F. to +25° F. for the non-refrigerated system 10A and a range of −50° F. to 0° F. for the refrigerated system 10B) than the first separator feed stream 31a (at −73° F.) in the '507 patent. For systems 10A and 10B, the higher separator 44 temperature allows for greater amount of energy or "refrigeration" to be delivered to the system from the expander 54. Since one of the benefits of the preferred embodiments of the invention is to be able to operate system 10A without refrigeration, the higher temperature and thus the greater refrigeration generated is beneficial. Additionally, in systems 10A and 10B, the side stream 84A/84B withdrawn from fractionation tower 42 passes through heat exchanger 68 for heat exchange with the mixed fractionation tower overhead stream and second separator bottoms stream 66A/66B. In the '507 patent, the side stream 36 passes through heat exchanger 20 with only the fractionation tower overhead stream. The heat exchange system in systems 10A and 10B allow the feed stream into second separator 98 (streams 96A/96B) to be at a warmer temperature (in the range of in a range of −70° F. to −95° F. for the non-refrigerated system 10A and −71° F. to −125° F. for system 10B with external refrigeration), than the second separator feed stream 36a (at −116° F.) in the '507 patent. One benefit of the higher temperature is to allow for more of the methane and ethane to be eliminated from the fractionator 42 as vapor (in overhead stream 58A/58B) and allow for a desired compositional change for the top feed stream 106B into the fractionation tower 42.

In addition to operational temperature differences based on the different heat exchange systems, operating pressures in systems 10A and 10B differ from those in FIG. 4 of the '507 patent. The first separator 44 in systems 10A and 10B operates at a pressure between 800 and 1100 psig, which is higher than the first separator 11 in the '507 patent (570 psia). In system 10A, the second separator 98 operates at a pressure between 150 and 300 psig. This is lower than the second separator 15 in the '507 patent, which operates at a pressure of 353 psia, similar to the range of 250 to 400 psig for system 10B, with external refrigeration. In system 10A, the fractionation tower operates at a pressure between 150 and 300 psig. This is also lower than the fractionation tower 17 in the '507 patent, which operates at a pressure of 355 psia, similar to the range of 300 and 400 psig for the fractionation tower in system 10B.

The propane recovery in the NGL product stream for the system in FIG. 4 in the '507 patent is 94%, with very low ethane in the NGL product stream. With the process changes in systems 10A and 10B noted above and in FIGS. 1-2, system 10A is able to achieve a 97% propane recovery with only 8% ethane recovery in the NGL product stream and system 10B is able to achieve a 98% propane recovery with only 5% ethane recovery in the NGL product stream using essentially the same equipment.

Example 3—Alternate Ethane Rejection without External Refrigeration

Figure 3:
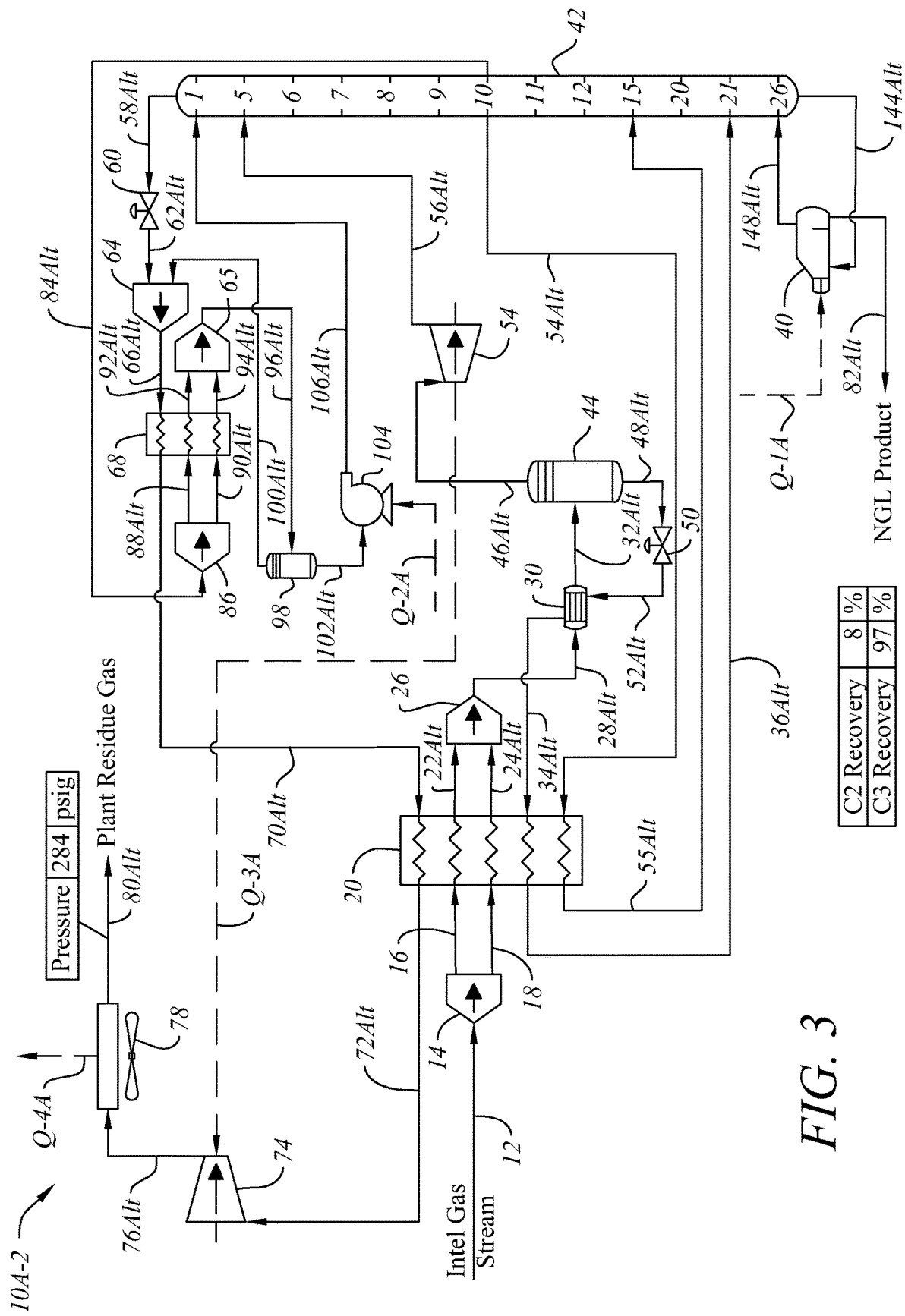
FIG. 3 is a process flow diagram illustrating principal processing stages for producing an NGL product stream in ethane rejection mode and without external refrigeration according to a preferred alternate embodiment of FIG. 1.

Referring to FIG. 3, an alternate preferred embodiment of system 10A is shown. System 10A-2 is a preferred alternate embodiment for processing NGL product streams in an ethane rejection mode that is particularly useful when the incoming feed stream 12 contains higher contents of condensable hydrocarbon components. System 10A-2 is preferably has the same equipment and process flows as system 10A, but an additional side stream 54Alt is withdrawn from fractionation tower 42, warmed in heat exchanger 20, and fed back into tower 42 as stream 55Alt.

Feed stream 12 comprises natural gas that has already been processed according to known methods to remove excessive amounts of $H_2S$, $CO_2$, and water, as needed. For the particular Example 3 described herein, feed stream 12 has the following basic parameters: (1) Pressure of near 975 PSIG; (2) Inlet temperature of near 120° F.; (3) Inlet gas flow of 100 Million Standard Cubic Feet per Day (MMSCFD); (4) Inlet nitrogen content of 2% by volume; (5) inlet $CO_2$ content of 0.5% by volume; (6) inlet methane content of 70.375% by volume; (7) inlet ethane content of 15% by volume; and (8) inlet propane content of 7.5 by volume. The parameters of other streams described herein are exemplary based on the data for feed stream 12 used in a computer simulation for Example 3. The temperatures, pressures, flow rates, and compositions of other process streams in system 10A-2 will vary depending on the nature of the feed stream and other operational parameters, as will be understood by those of ordinary skill in the art. Feed stream 12 is preferably directed to the inlet splitter 14 where the inlet gas is strategically split into two streams 16, 18 before passing through heat exchanger 20 and exiting as streams 22Alt, 24Alt having been cooled to around 31.3° F. The split between streams 16 and 18 is most preferably 50/50, as in Examples 1-2, but other ratios may also be used. Feed streams 22Alt, 24Alt are then recombined in mixer 26 to form stream 28Alt, which passes through heat exchanger 30, exiting as stream 32Alt having been cooled to around 12.5° F. Stream 32Alt is the feed stream for first separator 44.

First separator overhead stream 46Alt, containing around 78.6% methane, around 12.78% ethane, and around 4.33% propane at 12.36° F. and 962.8 psig, is expanded in expander 54, exiting as stream 56Alt. Stream 56Alt, at around −84° F. and 209.3 psig, is fed into fractionating column 42 near a top section of the tower as a fractionating tower feed stream.

First separator bottoms stream 48Alt, containing around 40% methane, around 22.96% ethane, and around 18.84% propane at 12.3° F. and 962.8 psig, passes through an expansion valve, exiting as stream 52Alt at −38.1° F. and 218.7 psig. Stream 52Alt then passes through heat exchanger 30, exiting as stream 34Alt, having been warmed to around 21.3° F. Stream 34Alt then passes through the heat exchanger 20, exiting as stream 36Alt warmed to 94.9° F. In this way, the bottoms stream from separator 44 undergoes two stages of heat exchange with the feed stream—once (as stream 52Alt) in heat exchanger 30 (with feed stream 28Alt) and again (as stream 34Alt) in heat exchanger 20 (with feed streams 16, 18, and along with a combined stream 70Alt formed by the fractionation column and second separator overhead streams). Stream 36Alt is then fed into a lower section of fractionating tower 42 as another fractionating tower feed stream.

A stream 84Alt is withdrawn from fractionating tower 42 from a mid-section of the tower. Stream 84Alt, containing around 34.8% methane, around 58.2% ethane, and around 5.57% propane at −7.3° F. and 207.4 psig, is split in splitter 86 into streams 88Alt and 90Alt. Most preferably stream 84Alt is split 50/50, but other ratios may also be used. Streams 88Alt and 90Alt pass through heat exchanger 68, exiting as streams 92Alt, 94Alt having been cooled to around −89.5° F. Streams 92Alt, 94Alt are then recombined in mixer 65 to form stream 96Alt, which feeds into second separator 98.

Second separator bottoms stream 102Alt, containing around 21.75% methane, around 70% ethane, and around 7.1% propane at −89.9° F. and 199.9 psig, is preferably pumped with pump 104, exiting pump 104 as stream 106Alt at a pressure of 224.9 psig. Stream 106Alt is another feed stream into the top of fractionating tower 42.

Second separator overhead stream 100Alt contains around 80.1% methane, around 17.5% ethane, and around 0.25% propane at −89.9° F. and 199.9 psig. Fractionating tower overhead stream 58Alt contains around 0.58% $CO_2$, around 2.3% nitrogen, around 81% methane, around 15.8% ethane, and around 0.234% propane at −92.6° F. and 206.32 psig. Stream 58Alt is expanded through expansion valve 60, exiting as stream 62Alt at −94.2° F. and 196.32 psig. These two overhead streams 62Alt and 100Alt are combined in mixer 64 forming stream 66Alt, which passes through heat exchanger 68, exiting as stream 70Alt having been warmed to around −11.9° F. Stream 70Alt then passes through heat exchanger 20, exiting as stream 72Alt having been warmed to around 115.5° F. Stream 72Alt is compressed in compressor 74 (preferably receiving energy Q-3A from expander 54), exiting as stream 76Alt. Stream 76Alt is preferably cooled in heat exchanger 78 to form residue gas stream 80Alt, containing around 0.57% $CO_2$, around 2.3% nitrogen, around 81% methane, around 15.89% ethane, and around 0.235% propane at 120° F. and 284.2 psig.

A stream 54Alt is withdrawn from fractionating tower 42 from a mid-section of the tower. Stream 54Alt, containing around 5.2% methane, around 63.44% ethane, and around 25.22% propane at −7.4° F. and 207.4 psig, passes through heat exchanger 20, exiting as stream 55Alt having been warmed to around 2.8° F. Stream 55Alt is then returned to tower 42 at a tray location (such as 15) that is lower than the location (such as tray 10) where stream 54Alt was withdrawn.

A liquid stream 144Alt is withdrawn from the bottom of fractionating tower 42, passing through reboiler 40, with vapor stream 148Alt being returned to tower 42 and fractionating tower bottoms stream 82Alt exiting as the NGL product stream. Stream 82Alt contains negligible nitrogen, 0.01% $CO_2$, 0.012% methane, 9.1% ethane, and 55.6% propane. The ethane recovery in NGL product stream 82Alt from the feed stream is 8% and the propane recovery in stream 82Alt is 97%.

The flow rates, temperatures and pressures of various flow streams referred to in connection with Example 3 of a preferred system and method of the invention in relation to FIG. 3, are based on a computer simulation for system 10A-2 having the feed stream characteristics discussed above and listed below in Table 5. The flow rates, temperatures and pressures of various flow streams in system 10A-2 based on a computer simulation of Example 3 using a feed stream having the feed stream content/parameters noted above are included in Tables 5 and 6 below. These temperatures, pressures, flow rates, and compositions will also vary depending on the nature of other parameters in the feed stream and other operational parameters as will be understood by those of ordinary skill in the art.

TABLE 5

Example 3, System 10A-2 - Alternate Rejection Mode without External Refrigeration

| Stream Properties | | | | | | |
|---|---|---|---|---|---|---|
| Property | Units | 12 | 16 | 18 | 22Alt | 24Alt |
| Temperature | ° F. | 120* | 120 | 120 | 31.3182* | 31.3182* |
| Pressure | psig | 975.257* | 975.257 | 975.257 | 970.257 | 970.257 |
| Molar Flow | lbmol/h | 10979.8 | 5489.91 | 5489.91 | 5489.91 | 5489.91 |
| Mole Fraction Vapor | % | 100 | 100 | 100 | 85.5855 | 85.5855 |
| Mole Fraction Light Liquid | % | 0 | 0 | 0 | 14.4145 | 14.4145 |

| Stream Composition | | | | | |
|---|---|---|---|---|---|
| Mole Fraction | 12 % | 16 % | 18 % | 22Alt % | 24Alt % |
| CO2 | 0.5* | 0.5 | 0.5 | 0.5 | 0.5 |
| N2 | 2* | 2 | 2 | 2 | 2 |
| C1 | 70.375* | 70.375 | 70.375 | 70.375 | 70.375 |
| C2 | 15* | 15 | 15 | 15 | 15 |
| C3 | 7.5* | 7.5 | 7.5 | 7.5 | 7.5 |
| iC4 | 1* | 1 | 1 | 1 | 1 |
| nC4 | 2.325* | 2.325 | 2.325 | 2.325 | 2.325 |
| iC5 | 0.5* | 0.5 | 0.5 | 0.5 | 0.5 |
| nC5 | 0.6* | 0.6 | 0.6 | 0.6 | 0.6 |
| C6 | 0.2* | 0.2 | 0.2 | 0.2 | 0.2 |

| Stream Properties | | | | | | |
|---|---|---|---|---|---|---|
| Property | Units | 28Alt | 32Alt | 34Alt | 36Alt | 46Alt |
| Temperature | ° F. | 31.3182 | 12.5* | 21.3102 | 94.9041* | 12.366 |
| Pressure | psig | 970.257 | 965.257 | 213.72 | 212.72 | 962.757 |
| Molar Flow | lbmol/h | 10979.8 | 10979.8 | 2391.52 | 2391.52 | 8588.31 |
| Mole Fraction Vapor | % | 85.5855 | 78.217 | 63.5045 | 92.7673 | 100 |
| Mole Fraction Light Liquid | % | 14.4145 | 21.783 | 36.4955 | 7.2327 | 0 |

| Stream Composition | | | | | |
|---|---|---|---|---|---|
| Mole Fraction | 28Alt % | 32Alt % | 34Alt % | 36Alt % | 46Alt % |
| CO2 | 0.5 | 0.5 | 0.498317 | 0.498317 | 0.500469 |
| N2 | 2 | 2 | 0.537953 | 0.537953 | 2.40712 |
| C1 | 70.375 | 70.375 | 40.7689 | 40.7689 | 78.6192 |

TABLE 5-continued

Example 3, System 10A-2 - Alternate Rejection Mode without External Refrigeration

| | | | | | |
|---|---|---|---|---|---|
| C2  | 15    | 15    | 22.9642  | 22.9642  | 12.7823  |
| C3  | 7.5   | 7.5   | 18.8482  | 18.8482  | 4.33995  |
| iC4 | 1     | 1     | 3.20697  | 3.20697  | 0.385442 |
| nC4 | 2.325 | 2.325 | 7.96563  | 7.96563  | 0.754301 |
| iC5 | 0.5   | 0.5   | 1.95084  | 1.95084  | 0.095995 |
| nC5 | 0.6   | 0.6   | 2.3912   | 2.3912   | 0.10122  |
| C6  | 0.2   | 0.2   | 0.867769 | 0.867769 | 0.014052 |

Stream Properties

| Property | Units | 48Alt | 52Alt | 54Alt | 55Alt |
|---|---|---|---|---|---|
| Temperature | ° F. | 12.366 | −38.1371 | −7.3886 | 2.79454 |
| Pressure | psig | 962.757 | 218.72* | 207.4 | 207.4 |
| Molar Flow | lbmol/h | 2391.52 | 2391.52 | 198.764 | 198.764 |
| Mole Fraction Vapor | % | 0 | 42.3976 | 0 | 6.5708 |
| Mole Fraction Light Liquid | % | 100 | 57.6024 | 100 | 93.4292 |

Stream Composition

| Mole Fraction | 48Alt % | 52Alt % | 54Alt % | 55Alt % |
|---|---|---|---|---|
| $CO_2$ | 0.498317 | 0.498317 | 0.242364 | 0.242364 |
| $N_2$  | 0.537953 | 0.537953 | 0.017909 | 0.017909 |
| C1  | 40.7689  | 40.7689  | 5.28582  | 5.28582  |
| C2  | 22.9642  | 22.9642  | 63.44    | 63.44    |
| C3  | 18.8482  | 18.8482  | 25.2271  | 25.2271  |
| iC4 | 3.20697  | 3.20697  | 1.70201  | 1.70201  |
| nC4 | 7.96563  | 7.96563  | 3.23374  | 3.23374  |
| iC5 | 1.95084  | 1.95084  | 0.388744 | 0.388744 |
| nC5 | 2.3912   | 2.3912   | 0.406903 | 0.406903 |
| C6  | 0.867769 | 0.867769 | 0.055441 | 0.055441 |

Stream Properties

| Property | Units | 56Alt | 58Alt | 62Alt | 66Alt | 70Alt |
|---|---|---|---|---|---|---|
| Temperature | ° F. | −84.7827 | −92.6801 | −94.2226 | −94.0838 | −11.9284 |
| Pressure | psig | 209.3* | 206.32 | 196.32 | 196.32 | 191.32 |
| Molar Flow | lbmol/h | 8588.31 | 9188.66 | 9188.66 | 9539.55 | 9539.55 |
| Mole Fraction Vapor | % | 88.7593 | 100 | 100 | 100 | 100 |
| Mole Fraction Light Liquid | % | 11.2407 | 0 | 0 | 0 | 0 |

Stream Composition

| Mole Fraction | 56Alt % | 58Alt % | 62Alt % | 66Alt % | 70Alt % |
|---|---|---|---|---|---|
| $CO_2$ | 0.500469 | 0.575758 | 0.575758 | 0.573715 | 0.573715 |
| $N_2$  | 2.40712  | 2.32929  | 2.32929  | 2.30196  | 2.30196  |
| C1  | 78.6192   | 81.0318  | 81.0318  | 80.9981  | 80.9981  |
| C2  | 12.7823   | 15.8264  | 15.8264  | 15.8887  | 15.8887  |
| C3  | 4.33995   | 0.234707 | 0.234707 | 0.235361 | 0.235361 |
| iC4 | 0.385442  | 0.000987 | 0.000987 | 0.000991 | 0.000991 |
| nC4 | 0.754301  | 0.001128 | 0.001128 | 0.001133 | 0.001133 |
| iC5 | 0.095995  | Neg | Neg | Neg | Neg |
| nC5 | 0.10122   | Neg | Neg | Neg | Neg |
| C6  | 0.0140518 | Neg | Neg | Neg | Neg |

Stream Properties

| Property | Units | 72Alt | 76Alt | 80Alt | 82Alt | 84Alt |
|---|---|---|---|---|---|---|
| Temperature | ° F. | 115.573 | 185.762 | 120* | 122.632 | −7.3886 |
| Pressure | psig | 186.32 | 289.236 | 284.236 | 210.82 | 207.4 |
| Molar Flow | lbmol/h | 9539.55 | 9539.55 | 9539.55 | 1440.26 | 1568.3 |
| Mole Fraction Vapor | % | 100 | 100 | 100 | 0 | 100 |
| Mole Fraction Light Liquid | % | 0 | 0 | 0 | 100 | 0 |

Stream Composition

| Mole Fraction | 72Alt % | 76Alt % | 80Alt % | 82Alt % | 84Alt % |
|---|---|---|---|---|---|
| $CO_2$ | 0.573715 | 0.573715 | 0.573715 | 0.0117399 | 0.59017 |
| $N_2$  | 2.30196  | 2.30196  | 2.30196  | Neg | 0.421289 |

TABLE 5-continued

Example 3, System 10A-2 - Alternate Rejection Mode without External Refrigeration

| | | | | | |
|---|---|---|---|---|---|
| C1 | 80.9981 | 80.9981 | 80.9981 | 0.012901 | 34.8151 |
| C2 | 15.8887 | 15.8887 | 15.8887 | 9.11556 | 58.2885 |
| C3 | 0.235361 | 0.235361 | 0.235361 | 55.6153 | 5.57009 |
| iC4 | 0.000991 | 0.000991 | 0.000991 | 7.61693 | 0.122805 |
| nC4 | 0.001133 | 0.001133 | 0.001133 | 17.7171 | 0.178391 |
| iC5 | Neg | Neg | Neg | 3.81169 | 0.00753 |
| nC5 | Neg | Neg | Neg | 4.57407 | 0.005969 |
| C6 | Neg | Neg | Neg | 1.5247 | 0.000154 |

Stream Properties

| Property | Units | 88Alt | 90Alt | 92Alt | 94Alt | 96Alt |
|---|---|---|---|---|---|---|
| Temperature | ° F. | −7.3886 | −7.3886 | −89.4918* | −89.4918* | −89.4918 |
| Pressure | psig | 207.4 | 207.4 | 202.4 | 202.4 | 202.4 |
| Molar Flow | lbmol/h | 784.149 | 784.149 | 784.149 | 784.149 | 1568.3 |
| Mole Fraction Vapor | % | 100 | 100 | 22.1606 | 22.1606 | 22.1606 |
| Mole Fraction Light Liquid | % | 0 | 0 | 77.8394 | 77.8394 | 77.8394 |

Stream Composition

| Mole Fraction | 88Alt % | 90Alt % | 92Alt % | 94Alt % | 96Alt % |
|---|---|---|---|---|---|
| CO2 | 0.59017 | 0.59017 | 0.59017 | 0.59017 | 0.59017 |
| N2 | 0.421289 | 0.421289 | 0.421289 | 0.421289 | 0.421289 |
| C1 | 34.8151 | 34.8151 | 34.8151 | 34.8151 | 34.8151 |
| C2 | 58.2885 | 58.2885 | 58.2885 | 58.2885 | 58.2885 |
| C3 | 5.57009 | 5.57009 | 5.57009 | 5.57009 | 5.57009 |
| iC4 | 0.122805 | 0.122805 | 0.122805 | 0.122805 | 0.122805 |
| nC4 | 0.178391 | 0.178391 | 0.178391 | 0.178391 | 0.178391 |
| iC5 | 0.00753 | 0.00753 | 0.00753 | 0.00753 | 0.00753 |
| nC5 | 0.005969 | 0.005969 | 0.005969 | 0.005969 | 0.005969 |
| C6 | 0.000154 | 0.000154 | 0.000154 | 0.000154 | 0.000154 |

Stream Properties

| Property | Units | 100Alt | 102Alt | 106Alt | 144Alt |
|---|---|---|---|---|---|
| Temperature | ° F. | −89.9119 | −89.9119 | −89.6562 | 107.16 |
| Pressure | psig | 199.9 | 199.9 | 224.9 | 210.82 |
| Molar Flow | lbmol/h | 350.897 | 1217.4 | 1217.4 | 2058.62 |
| Mole Fraction Vapor | % | 100 | 0 | 0 | 0 |
| Mole Fraction Light Liquid | % | 0 | 100 | 100 | 100 |

Stream Composition

| Mole Fraction | 100Alt % | 102Alt % | 106Alt % | 144Alt % |
|---|---|---|---|---|
| CO2 | 0.520234 | 0.610328 | 0.610328 | 0.0275215 |
| N2 | 1.58632 | 0.085485 | 0.085485 | 1.7592E−06 |
| C1 | 80.1178 | 21.7573 | 21.7573 | 0.0476131 |
| C2 | 17.5208 | 70.0392 | 70.0392 | 13.8544 |
| C3 | 0.252481 | 7.10281 | 7.10281 | 57.2213 |
| iC4 | 0.00109502 | 0.157887 | 0.157887 | 6.63664 |
| nC4 | 0.00125556 | 0.229448 | 0.229448 | 14.7109 |
| iC5 | Neg | 0.009697 | 0.009697 | 2.92981 |
| nC5 | Neg | 0.007688 | 0.007688 | 3.47077 |
| C6 | Neg | 0.000199 | 0.000199 | 1.10098 |

Stream Properties

| Property | Units | 148Alt |
|---|---|---|
| Temperature | ° F. | 122.632 |
| Pressure | psig | 210.82 |
| Molar Flow | lbmol/h | 618.366 |
| Mole Fraction Vapor | % | 100 |
| Mole Fraction Light Liquid | % | 0 |

TABLE 5-continued

Example 3, System 10A-2 - Alternate Rejection Mode
without External Refrigeration Stream Composition

| Mole Fraction | 148Alt % |
|---|---|
| CO2 | 0.0642789 |
| N2 | Neg |
| C1 | 0.128462 |
| C2 | 24.8919 |
| C3 | 60.962 |
| iC4 | 4.3534 |
| nC4 | 7.70903 |
| iC5 | 0.875804 |
| nC5 | 0.901052 |
| C6 | 0.114059 |

TABLE 6

Example 3, System 10A-2 Alternate Energy Streams

| Energy Stream | Energy Rate (MBtu/hr) | Power (hp) | From | To |
|---|---|---|---|---|
| Q-1A | 4346.01 | — | — | Reboiler 40 |
| Q-2A | 6.90435 | — | — | Pump 104 |
| Q-3A | 6209.4 | 2440.39 | Expander 54 | Compressor 74 |
| Q-4A | 6374.95 | | Heat Exchanger/Cooler 78 | — |

It will be appreciated by those of ordinary skill in the art that the values in the Tables are based on the particular parameters and composition of the feed stream in the above Example 3. The values will differ depending on the parameters and composition of the feed stream 12 and operational parameters for system 10A-2 as will be understood by those of ordinary skill in the art.

System 10A-2 is similar to FIG. 6 in U.S. Pat. No. 5,799,507. One important difference between system 10A-2 and the system depicted in FIG. 6 of the '507 patent is that the heat exchange systems are different. In system 10A-2, feed stream 12 is split with each part of the feed stream (streams 16 and 18) passing through heat exchanger 20 (upstream of heat exchanger 30) with the mixed fractionation tower overhead stream and second separator overhead stream 70Alt (downstream of heat exchanger 68) and first separator bottoms stream 34Alt (downstream of heat exchanger 30). In the '507 patent, the feed stream is not split and the first separator bottoms stream is not warmed prior to heat exchange with the feed stream and mixed fractionation tower overhead stream and second separator bottoms stream. By passing the first separator bottoms stream through heat exchangers 30 and 20, it is possible to warm that stream sufficiently that it feeds into fractionation tower 42 (as stream 36Alt) at a higher temperature (up to 110° F., depending on the inlet gas composition and operating conditions, although that stream may also feed into fractionation tower 42 at temperatures in the range of 25° F. to 110° F.) than the 71° F. of stream 33b in the '507 patent. This makes it possible to operate fractionation tower 42 with minimal external heat input which in turn allows for a greater efficiency overall. It also allows the feed stream into first separator 44 (streams 32Alt) to be warmer (in the range of −25° F. to +25° F.) than the first separator feed stream 31a (at −75° F.) in the '507 patent. For system 10A-2, the higher separator 44 temperature allows for greater amount of energy or "refrigeration" to be delivered to the system from the expander 54. Since one of the benefits of the preferred embodiments of the invention is to be able to operate system 10A-2 without refrigeration, the higher temperature and thus the greater refrigeration generated is beneficial. Additionally, in system 10A-2, the side stream 84Alt withdrawn from fractionation tower 42 passes through heat exchanger 68 for heat exchange with the mixed fractionation tower overhead stream and second separator bottoms stream 66Alt. In the '507 patent, the side stream 36 passes through heat exchanger 20 with only the fractionation tower overhead stream. The heat exchange system in system 10A-2 allow the feed stream into second separator 98 (stream 96Alt) to be at a warmer temperature (in the range of in a range of −70° F. to −95° F.), than the second separator feed stream 36a (at −114° F.) in the '507 patent. One benefit of the higher temperature is to allow for more of the methane and ethane to be eliminated from the fractionator 42 as vapor (in overhead stream 58Alt) and allow for a desired compositional change for the top feed stream 106Alt into the fractionation tower 42. In system 10A-2, the side stream 54Alt withdrawn from fractionation tower 42 is significantly warmer (in the range of −20° F. to +50° F.) than stream 35 at −112° F. in the '507 patent and the returned stream 55Alt is also significantly warmer (in the range of 0° F. to 60° F.) than stream 35a at −46° F. in the '507 patent. Side stream 54Alt also has significantly less methane (between 2 to 10%) and more ethane (between 40% to 80%) than stream 35 at 55% methane, 32% ethane in the '507 patent. The process depicted in FIG. 6 of the '507 patent results in a 93.96% propane recovery in the NGL stream 37 from feed stream 31, whereas system 10A-2 in Example 3 achieves a 97% propane recovery.

In addition to operational temperature differences based on the different heat exchange systems, operating pressures in system 10A-2 differ from those in FIG. 6 of the '507 patent. The first separator 44 in system 10A-2 operates at a pressure between 800 and 1100 psig, which is higher than the first separator 11 in the '507 patent (570 psia). In system 10A-2, the second separator 98 operates at a pressure between 150 and 300 psig. This is lower than the second separator 15 in the '507 patent, which operates at a pressure of 369 psia. In system 10A-2, the fractionation tower operates at a pressure between 150 and 300 psig. This is also lower than the fractionation tower 17 in the '507 patent, which operates at a pressure of 371 psia.

Example 4—Ethane Retention

Referring to FIG. 4, a preferred embodiment of system 10C for processing NGL product streams in an ethane retention (or recovery) mode is shown. Like systems 10A/ 10A-2 and 10B, system 10C preferably comprises heat exchangers 20, 30, and 68, a first separator 44, and a fractionating tower 42. System 10C also has heat exchanger/ external refrigeration 110, like system 10B. Second separator 98 and pump 104 from systems 10A/10A-2 and 10B are not needed in system 10C.

The flow rates, temperatures and pressures of various flow streams of a preferred system and method of the invention in relation to FIG. 4 described herein are exemplary and based on a computer simulation for system 10C in Example 4 having the feed stream 12 characteristics noted in Table 7 below. The temperatures, pressures, flow rates, and compositions of other process streams in system 10C will vary depending on the nature of the feed stream and other operational parameters, as will be understood by those of ordinary skill in the art. Feed stream 12 is preferably directed to the inlet splitter 14 where the inlet gas is strategically split into two streams 16C, 18C. In Examples 1-3 for systems 10A, 10A-2, and 10B, this split was equal, but in Example 4 for system 10C, stream 18C preferably has around 49% of the flow from feed stream 12. Most preferably, stream 18C has around 25 to 60% of feed stream 12 with the balance being in stream 16C for system 10C. Stream 16C passes through heat exchanger 20, exiting as stream 22C having been cooled from 120° F. to around −19.8° F. Feed stream 18C passes through heat exchanger 40, which is a tube side of reboiler 40 for fractionation tower 42, exiting as stream 150 having been cooled to around 57.82° F. Stream 150 then passes through heat exchanger/ external refrigeration 110, exiting as stream 24C having been further cooled to −30° F. Feed streams 22C, 24C are then recombined in mixer 26 to form stream 32C, which is the feed stream for first separator 44. Stream 32C feeds separator 44 at −25° F., which is colder than the feed to separator 44 in systems 10A/10B. Heat exchanger 30 is not needed upstream of separator 44 in system 10C.

First separator overhead stream 46C, containing around 84.01% methane, around 9.8% ethane, and around 2.5% propane at −25° F. and 962.3 psig, is split into stream 126 (around 12.5% of the flow of stream 46C) and 152 (around 87.5% of the flow of stream 46C) in splitter 114. Most preferably stream 126 contains between 10 to 30% of the flow of stream 46C, with the balance to stream 152. Stream 152 is expanded in expander 54, exiting as stream 56C. Stream 56C, at around −100° F. and 315 psig (higher pressure than in systems 10A/10B), is fed into fractionating column 42 near a mid-section of the tower as a fractionating tower feed stream.

First separator bottoms stream 48C, containing around 52.8% methane, around 22.1% ethane, and around 14.2% propane at −25° F. and 962.3 psig is split into streams 128 (around 32.5% of the flow from stream 48C) and 52C (around 67.5% of the flow from stream 48C) in splitter 112. Most preferably stream 128 contains between 0 to 50% of the flow of stream 48C, with the balance to stream 52C. Stream 128 is mixed with overhead stream 126 in mixer 130 to form stream 132, containing 63.4% methane, 17.9% ethane, and 10.2% propane at −25° F. and 962.3 psig. Stream 132 passes through heat exchanger 68, exiting as stream 134 having been cooled to −151.4° F. Stream 134 is expanded through expansion valve 136 to form stream 138 at −148.9° F. and 285 psig before feeding into a top section of fractionation tower 42. Stream 52C passes through an expansion valve 50, exiting as stream 36C at −72.8° F. and 309 psig, which feeds tower 42 slightly below its mid-point.

A stream 140 is withdrawn from fractionating tower 42 from a lower section of the tower. Stream 140, containing around 14.7% methane, around 54.1% ethane, and around 19.7% propane at −21.2° F. and 309 psig, passes through heat exchanger 20, exiting as stream 142 having been warmed to around 110.3° F. Stream 142 is then returned to tower 42 at a tray location (such as 21) that is lower than the location (such as tray 20) where stream 140 was withdrawn.

Fractionating tower overhead stream 58C, containing around 96.9% methane, around 0.3% ethane, and negligible propane at −155.3° F. and 307.1 psig, passes through heat exchanger 68, exiting as stream 70C. Stream 70C, having been warmed to −35.7° F., then passes through heat exchanger 20, exiting as stream 72C at 87.2° F. Stream 72C is compressed in compressor 74 (preferably receiving energy Q-3C from expander 54), exiting as stream 76C at 117° F. and 354.9 psig. Stream 76C is preferably cooled in heat exchanger 78 to form residue gas stream 80C, containing around 0.086% $CO_2$, 2.8% nitrogen, around 96.8% methane, around 0.28% ethane, and negligible propane at 120° F. and 349.9 psig (higher pressure than stream 80A and around the same as stream 80B). A portion of stream 80C is recycled back as stream 116. Stream 116 passes through heat exchanger 20, exiting as stream 118 cooled to −20.15° F. Stream 118 then passes through heat exchanger 68, exiting as stream 120, further cooled to −151.4° F. Stream 120 is expanded in expansion valve 122 to form stream 124 at −164.8° F. and 285 psig, which feeds into the top of fractionation tower 42.

A liquid stream 144C is withdrawn from the bottom of fractionating tower 42, passing through the shell side of reboiler 40, with vapor stream 148C being returned to tower 42 and fractionating tower bottoms stream 82C exiting as the NGL product stream. Stream 82C contains 0.28% $CO_2$, negligible nitrogen, 0.83% methane, 54.35% ethane, and 27.55% propane. The ethane recovery in NGL product stream 82C from the feed stream is 99% and the propane recovery in stream 82C is 100%.

The flow rates, temperatures and pressures of various flow streams referred to in connection with Example 4 of a preferred system and method of the invention in relation to FIG. 4, are based on a computer simulation for system 10C having the feed stream characteristics discussed above and listed below in Table 7, with a preferred maximum $CO_2$ feed stream content. System 10C may be operated with up to 0.14% $CO_2$ in feed stream 12 without encountering freezing problems typically encountered in prior art systems and while still meeting a 2% maximum $CO_2$ content in the residue gas specification. This allows system 10C to be operated without pretreating the feed stream to remove $CO_2$ or with reduced pretreatment requirements. The flow rates, temperatures and pressures of various flow streams in system 10C based on a computer simulation of Example 4 using a feed stream have 0.14% $CO_2$ (and other feed stream content/parameters noted below) are included in Tables 7 and 8 below. These temperatures, pressures, flow rates, and compositions will also vary depending on the nature of other parameters in the feed stream and other operational parameters as will be understood by those of ordinary skill in the art.

TABLE 7

Example 4, System 10C - Retention Mode

Stream Properties

| Property | Units | 12 | 16C | 18C | 22C | 24C |
|---|---|---|---|---|---|---|
| Temperature | ° F. | 120* | 120 | 120 | −19.7618 | −30* |
| Pressure | psig | 975.257* | 975.257 | 975.257 | 970.257 | 965.257 |
| Molar Flow | lbmol/h | 10979.8 | 5595.42 | 5384.41 | 5595.42 | 5384.41 |
| Mole Fraction Vapor | % | 100 | 100 | 100 | 60.5779 | 52.9048 |
| Mole Fraction Light Liquid | % | 0 | 0 | 0 | 39.4221 | 47.0952 |

Stream Composition

| Mole Fraction | 12 % | 16C % | 18C % | 22C % | 24C % |
|---|---|---|---|---|---|
| CO2 | 0.14* | 0.14 | 0.14 | 0.14 | 0.14 |
| N2 | 2.00724* | 2.00724 | 2.00724 | 2.00724 | 2.00724 |
| C1 | 70.6296* | 70.6296 | 70.6296 | 70.6296 | 70.6296 |
| C2 | 15.0543* | 15.0543 | 15.0543 | 15.0543 | 15.0543 |
| C3 | 7.52714* | 7.52714 | 7.52714 | 7.52714 | 7.52714 |
| iC4 | 1.00362* | 1.00362 | 1.00362 | 1.00362 | 1.00362 |
| nC4 | 2.33341* | 2.33341 | 2.33341 | 2.33341 | 2.33341 |
| iC5 | 0.501809* | 0.501809 | 0.501809 | 0.501809 | 0.501809 |
| nC5 | 0.602171* | 0.602171 | 0.602171 | 0.602171 | 0.602171 |
| C6 | 0.200724* | 0.200724 | 0.200724 | 0.200724 | 0.200724 |

Stream Properties

| Property | Units | 32C | 36C | 46C | 48C | 52C |
|---|---|---|---|---|---|---|
| Temperature | ° F. | −25* | −72.8336 | −25.1705 | −25.1705 | −25.1705 |
| Pressure | psig | 965.257 | 309.03* | 962.257 | 962.257 | 962.257 |
| Molar Flow | lbmol/h | 10979.8 | 3179.61 | 6269.29 | 4710.54 | 3179.61 |
| Mole Fraction Vapor | % | 57.0287 | 41.489 | 100 | 0 | 0 |
| Mole Fraction Light Liquid | % | 42.9713 | 58.511 | 0 | 100 | 100 |

Stream Composition

| Mole Fraction | 32C % | 36C % | 46C % | 48C % | 52C % |
|---|---|---|---|---|---|
| CO2 | 0.14 | 0.158706 | 0.125945 | 0.158706 | 0.158706 |
| N2 | 2.00724 | 0.787452 | 2.92374 | 0.787452 | 0.787452 |
| C1 | 70.6296 | 52.8211 | 84.0104 | 52.8211 | 52.8211 |
| C2 | 15.0543 | 22.0674 | 9.7848 | 22.0674 | 22.0674 |
| C3 | 7.52714 | 14.1818 | 2.52702 | 14.1818 | 14.1818 |
| iC4 | 1.00362 | 2.09057 | 0.186918 | 2.09057 | 2.09057 |
| nC4 | 2.33341 | 4.96495 | 0.356162 | 4.96495 | 4.96495 |
| iC5 | 0.501809 | 1.11847 | 0.038473 | 1.11847 | 1.11847 |
| nC5 | 0.602171 | 1.34855 | 0.041366 | 1.34855 | 1.34855 |
| C6 | 0.200724 | 0.460961 | 0.005190 | 0.460961 | 0.460961 |

Stream Properties

| Property | Units | 56C | 58C | 70C | 72C |
|---|---|---|---|---|---|
| Temperature | ° F. | −100.142 | −155.372 | −35.7051 | 87.1795 |
| Pressure | psig | 315* | 307.09 | 302.09 | 297.09 |
| Molar Flow | lbmol/h | 5485.63 | 9901.39 | 9901.39 | 9901.39 |
| Mole Fraction Vapor | % | 88.0412 | 100 | 100 | 100 |
| Mole Fraction Light Liquid | % | 11.9588 | 0 | 0 | 0 |

Stream Composition

| Mole Fraction | 56C % | 58C % | 70C % | 72C % |
|---|---|---|---|---|
| CO2 | 0.125945 | 0.086277 | 0.086277 | 0.086277 |
| N2 | 2.92374 | 2.76182 | 2.76182 | 2.76182 |
| C1 | 84.0104 | 96.8716 | 96.8716 | 96.8716 |
| C2 | 9.7848 | 0.280254 | 0.280254 | 0.280254 |
| C3 | 2.52702 | Neg | Neg | Neg |
| iC4 | 0.186918 | Neg | Neg | Neg |
| nC4 | 0.356162 | Neg | Neg | Neg |
| iC5 | 0.038473 | 0 | 0 | 0 |
| nC5 | 0.041366 | 0 | 0 | 0 |
| C6 | 0.005190 | 0 | 0 | 0 |

TABLE 7-continued

Example 4, System 10C - Retention Mode

Stream Properties

| Property | Units | 76C | 80C | 82C |
|---|---|---|---|---|
| Temperature | ° F. | 117.044 | 120* | 68.5196 |
| Pressure | psig | 354.937 | 349.937 | 311.09 |
| Molar Flow | lbmol/h | 9901.39 | 9901.39 | 2999.81 |
| Mole Fraction Vapor | % | 100 | 100 | 0 |
| Mole Fraction Light Liquid | % | 0 | 0 | 100 |

Stream Composition

| Mole Fraction | 76C % | 80C % | 82C % |
|---|---|---|---|
| $CO_2$ | 0.086277 | 0.086277 | 0.282667 |
| $N_2$ | 2.76182 | 2.76182 | 1.82121E−09 |
| C1 | 96.8716 | 96.8716 | 0.825265 |
| C2 | 0.280254 | 0.280254 | 54.3521 |
| C3 | Neg | Neg | 27.5505 |
| iC4 | Neg | Neg | 3.67341 |
| nC4 | Neg | Neg | 8.54067 |
| iC5 | 0 | 0 | 1.83671 |
| nC5 | 0 | 0 | 2.20405 |
| C6 | 0 | 0 | 0.734683 |

Stream Properties

| Property | Units | 102 | 103 | 116 | 118 | 120 |
|---|---|---|---|---|---|---|
| Temperature | ° F. | 120 | 120* | 120 | −20.1516* | −151.399* |
| Pressure | psig | 900 | 900* | 900 | 895 | 890 |
| Molar Flow | lbmol/h | 1921.47 | 9901.39 | 1921.47 | 1921.47 | 1921.47 |
| Mole Fraction Vapor | % | 100 | 100 | 100 | 100 | 0 |
| Mole Fraction Light Liquid | % | 0 | 0 | 0 | 0 | 100 |

Stream Composition

| Mole Fraction | 102 % | 103 % | 116 % | 118 % | 120 % |
|---|---|---|---|---|---|
| $CO_2$ | 0.086277 | 0.086277 | 0.086278 | 0.086278 | 0.086278 |
| $N_2$ | 2.76182 | 2.76182 | 2.76183 | 2.76183 | 2.76183 |
| C1 | 96.8716 | 96.8716 | 96.8718 | 96.8718 | 96.8718 |
| C2 | 0.280254 | 0.280254 | 0.280034 | 0.280034 | 0.280034 |
| C3 | Neg | Neg | Neg | Neg | Neg |
| iC4 | Neg | Neg | Neg | Neg | Neg |
| nC4 | Neg | Neg | Neg | Neg | Neg |
| iC5 | 0 | 0 | 0 | 0 | 0 |
| nC5 | 0 | 0 | 0 | 0 | 0 |
| C6 | 0 | 0 | 0 | 0 | 0 |

Stream Properties

| Property | Units | 124 | 126 | 128 | 132 | 134 |
|---|---|---|---|---|---|---|
| Temperature | ° F. | −164.777 | −25.1705 | −25.1705 | −25.1705 | −151.399* |
| Pressure | psig | 285* | 962.257 | 962.257 | 962.257 | 957.257 |
| Molar Flow | lbmol/h | 1921.47 | 783.661 | 1530.92 | 2314.59 | 2314.59 |
| Mole Fraction Vapor | % | 8.09029 | 100 | 0 | 33.8575 | 0 |
| Mole Fraction Light Liquid | % | 91.9097 | 0 | 100 | 66.1425 | 100 |

Stream Composition

| Mole Fraction | 124 % | 126 % | 128 % | 132 % | 134 % |
|---|---|---|---|---|---|
| $CO_2$ | 0.086278 | 0.125945 | 0.158706 | 0.147614 | 0.147614 |
| $N_2$ | 2.76183 | 2.92374 | 0.787452 | 1.51075 | 1.51075 |
| C1 | 96.8718 | 84.0104 | 52.8211 | 63.381 | 63.381 |
| C2 | 0.280034 | 9.7848 | 22.0674 | 17.9088 | 17.9088 |
| C3 | Neg | 2.52702 | 14.1818 | 10.2358 | 10.2358 |
| iC4 | Neg | 0.186918 | 2.09057 | 1.44604 | 1.44604 |
| nC4 | Neg | 0.356162 | 4.96495 | 3.40453 | 3.40453 |
| iC5 | 0 | 0.038473 | 1.11847 | 0.752807 | 0.752807 |
| nC5 | 0 | 0.041366 | 1.34855 | 0.90597 | 0.90597 |
| C6 | 0 | 0.005190 | 0.460961 | 0.306648 | 0.306648 |

TABLE 7-continued

Example 4, System 10C - Retention Mode

Stream Properties

| Property | Units | 138 | 140 | 142 | 144C |
|---|---|---|---|---|---|
| Temperature | °F. | −148.967 | −21.2504 | 110.288 | 52.9533 |
| Pressure | psig | 285* | 309.37 | 304.37 | 311.59 |
| Molar Flow | lbmol/h | 2314.59 | 1286.93 | 1286.83 | 4067.96 |
| Mole Fraction Vapor | % | 0 | 0 | 97.3762 | 0 |
| Mole Fraction Light Liquid | % | 100 | 100 | 2.62381 | 100 |

Stream Composition

| Mole Fraction | 138 % | 140 % | 142 % | 144C % |
|---|---|---|---|---|
| CO2 | 0.147614 | 0.547456 | 0.546919 | 0.427401 |
| N2 | 1.51075 | Neg | Neg | Neg |
| C1 | 63.381 | 14.6819 | 14.6848 | 1.85622 |
| C2 | 17.9088 | 54.1442 | 54.14 | 60.3225 |
| C3 | 10.2358 | 19.7042 | 19.7054 | 24.0994 |
| iC4 | 1.44604 | 2.40667 | 2.40682 | 2.94504 |
| nC4 | 3.40453 | 5.52041 | 5.52077 | 6.73265 |
| iC5 | 0.752807 | 1.15664 | 1.15672 | 1.39981 |
| nC5 | 0.90597 | 1.38261 | 1.38271 | 1.67028 |
| C6 | 0.306648 | 0.455895 | 0.455928 | 0.546684 |

Stream Properties

| Property | Units | 148C | 150 | 152 |
|---|---|---|---|---|
| Temperature | °F. | 68.5196 | 57.8193 | −25.1705 |
| Pressure | psig | 311.09 | 970.257 | 962.257 |
| Molar Flow | lbmol/h | 1068.15 | 5384.41 | 5485.63 |
| Mole Fraction Vapor | % | 100 | 94.0436 | 100 |
| Mole Fraction Light Liquid | % | 0 | 5.95642 | 0 |

Stream Composition

| Mole Fraction | 148C % | 150 % | 152 % |
|---|---|---|---|
| CO2 | 0.833873 | 0.14 | 0.125945 |
| N2 | Neg | 2.00724 | 2.92374 |
| C1 | 4.75155 | 70.6296 | 84.0104 |
| C2 | 77.0898 | 15.0543 | 9.7848 |
| C3 | 14.4076 | 7.52714 | 2.52702 |
| iC4 | 0.899472 | 1.00362 | 0.186918 |
| nC4 | 1.65498 | 2.33341 | 0.356162 |
| iC5 | 0.172836 | 0.501809 | 0.038473 |
| nC5 | 0.171229 | 0.602171 | 0.041366 |
| C6 | 0.018703 | 0.200724 | 0.005190 |

TABLE 8

Example 4, System 10C Energy Streams

| Energy Stream | Energy Rate (MBtu/hr) | Power (hp) | From | To |
|---|---|---|---|---|
| Q-Exp | −2.945 | | Heat Exchanger/Cooler 78 | |
| Q-1C | 5992.79 | | QRCYL-1 | Reboiler 40 |
| Q-1C (Virtual) | 5993.7 | | Reboiler 40 | QRCYL-1 |
| Q-3C | 2417.73 | 1360.1 | Expander 54 | Compressor 74 |
| Q-5C | 12011.2 | | Heat Exchanger/External Refrigeration 110 | — |

It will be appreciated by those of ordinary skill in the art that the values in the Tables are based on the particular parameters and composition of the feed stream in the above Example 4. The values will differ depending on the parameters and composition of the feed stream 12 and operational parameters for system 10C as will be understood by those of ordinary skill in the art.

System 10C can also be run in rejection mode without using the additional equipment from system 10A/10A-2/10B, similar to the way the systems described in U.S. Pat. No. 5,568,737 may be operated in retention (recovery) or rejection mode with a single separator and a fractionation tower, as will be understood by those of ordinary skill in the art. However, it is preferred to add and utilize the second separator 98 and pump 104 from systems 10A/10A-2/10B when it is desired to operate in rejection mode. This is because if system 10C is operated in rejection mode under the parameters of the example described above, NGL product stream 80C would still have approximately 80,000 galls per day of ethane. This is compared to only around 20,000 gallons per day of ethane when using system 10B. Since ethane currently can have a negative value of around $0.10 per gallon, the difference between operating system 10C in rejection mode and operating system 10B is a loss of around $6,000 per day or $2.1 million per year. In addition, the external refrigeration system will be required for the ethane rejection mode significantly increasing the operating costs.

System 10C is similar to FIG. 4 in U.S. Pat. No. 5,568, 737. One important difference between system 10C and the system depicted in FIG. 4 of the '737 patent is that the heat exchange systems are different. In system 10C, feed stream 12 is split with part of the feed stream (stream 16C) passing through heat exchanger 20 with the fractionation tower overhead stream 70C (downstream of heat exchanger 68), residue recycle stream 116 (upstream of heat exchanger 68), and withdrawn fractionation tower stream 140, while another part of the feed stream (stream 18C) under goes heat exchange in reboiler 40 with liquid stream 144 from fractionation tower 42 and is then cooled further with external refrigeration 110. In the 737 patent, the feed stream is split, with part undergoing heat exchange twice (heat exchangers 10 and 10a) with only part of the fractionation tower overhead stream 45. The other part of the feed stream undergoes heat exchange separately with the NGL product stream (in heat exchanger 11) and withdrawn fractionation tower streams (in heat exchangers 12 and 13). The residue recycle stream 42 in the 737 patent does not exchange heat with the feed stream at all. The ethane recovery for the system in FIG. 4 in the 737 patent is 97%. With the process changes in system 10C noted above and in FIG. 4 of this disclosure, system 10C is able to achieve a 99% ethane recovery and 100% propane recovery using fewer heat exchangers.

Systems 10A (or 10A-2) and 10B can be built as a single system including external refrigeration 110 and optionally including the equipment necessary to withdraw and return streams 54Alt and 55Alt from tower 42 for system 10A-2, which may be bypassed if inlet feed gas composition and ethane requirements for the NGL product stream 82A/82B/82Alt do not warrant use of external refrigeration 110 or the additional side stream 54Alt heat exchange, as will be understood by those of ordinary skill in the art. Alternatively, external refrigeration 110 can easily be added onto system 10A or 10A-2, if it later becomes desirable to do so. Additionally, because system 10C preferably has multiple pieces of equipment in common with systems 10A/10B/10A-2, existing versions of systems 10A, 10A-2, or 10B to be easily retrofitted with components from system 10C if it becomes desirable to switch from ethane rejection mode to ethane retention mode. Similarly, an existing version of system 10C could easily be retrofitted to operate as a system 10A, 10A-2, or 10B if it becomes desirable to switch from ethane retention to ethane rejection mode. Alternatively, a single system 10 combining all components of systems 10A (or 10A-2 and/or 10B) and 10C may be constructed so that the system can be switched between ethane rejection or ethane recovery modes with slight modifications in the processing and stream connections (for example, so that certain equipment in system 10C is bypassed when the system of 10A/10A-2/10B needs to be operated) and/or can be switched between ethane rejection with external refrigeration mode (system 10B) and ethane rejection without external refrigeration mode (system 10A, 10A-2), if it is desired to do so.

A preferred method for processing a natural gas feed stream 12 to produce a residue gas stream 80A/80Alt/80B/80C primarily comprising methane and an NGL stream 82A/82Alt/82B/82C, in either an ethane retention mode or ethane rejection mode, comprises the following steps: (1) separating feed stream 12 in a first separator 44 into a first overhead stream 44A/44Alt/44B/44C and a first bottoms stream 48A/48Alt/48B/48C; (2); separating the first overhead stream and first bottoms stream in a first fractionating column 42 into a fractionation column overhead stream (or second overhead stream) 58A/58/Alt/58B/58C and a fractionation columns bottoms stream (or second bottoms stream) 82A/82Alt/82B/82C; (3) cooling a first portion of the feed stream 16/16C prior to the first separator 44 through heat exchange in heat exchanger 20 with a first set of other streams; (4) warming the second overhead stream 58A/58Alt/58B/58C prior to heat exchanger 20 through heat exchange in heat exchanger 68 with a second set of other streams; (5) optionally (a) withdrawing side stream 84A/84Alt/84B from a mid-point on the fractionation column 42, (b) separating side stream 84A/84Alt/84B in a second separator 98 into a third overhead stream 100A/100Alt/100B and a third bottoms stream 102A/102Alt/102B, and (c) feeding the third bottoms stream into a top portion of the fractionation column 42 in an ethane rejection mode; (6) wherein the first set of other streams comprises (a) the first bottoms stream, the second overhead stream after the heat exchanger 68, and the third overhead stream after the heat exchanger 68, and optionally a side stream 54Alt withdrawn from fractionation tower 42 in ethane rejection mode or (b) side stream 140 withdrawn from a lower portion of the fractionation tower 42 and a recycled portion of the residue gas stream 116 in ethane retention mode; and (7) wherein the second set of other streams comprises (a) side stream 84A/84Alt/84B-R and the third overhead stream 100A/100Alt/100B in ethane rejection mode or (b) the recycled portion of the residue gas stream 118 after the heat exchanger 20, a first portion of the first bottoms stream 128 and a first portion of the first overhead stream 126 in ethane retention mode. In ethane retention mode or ethane rejection mode, the residue gas stream comprises the second overhead stream and the NGL product stream comprises the second bottoms stream. In ethane rejection mode, the residue gas stream further comprises the third overhead stream.

According to other preferred embodiments of a method for processing a natural gas feed stream 12 to produce a residue gas stream 80A/80Alt/80B/80C primarily comprising methane and an NGL stream 82A/82Alt/82B/82C, in either an ethane retention mode or ethane rejection mode, the method further comprises one or more of the following steps: (8) combining (a) the second overhead stream and the third overhead stream into stream 66A/66Alt/66B prior to heat exchanger 68 in ethane rejection mode or (b) the first portion of the first bottoms stream and the first portion of the first overhead stream into stream 132 prior to heat exchanger 68 in ethane retention mode; (9) expanding the second overhead stream through an expansion valve 60 prior to heat exchanger 68 in ethane rejection mode; (10) supplying external refrigerant to a third heat exchanger 110 to cool (a) side stream 84B prior to heat exchanger 68 in ethane rejection mode or (b) a second portion of the feed stream 18C/150 in ethane retention mode; (11) splitting the feed stream 12 into first and second portions 16/16C and 18/18C prior to any heat exchange (excluding any heat exchange that may be included in pre-processing feed stream 12 to remove water and other contaminants) in either ethane rejection mode or ethane retention mode; (12) combining the first and second portions of the feed stream into stream 28A/28Alt/28B/32C prior to feeding the first separator 44 in either ethane rejection mode or ethane retention mode; (13) cooling both portions of the feed stream 16/18 in heat exchanger 20 in ethane rejection mode; (14) splitting side stream 84A/84Alt/84B prior to heat exchanger 68 in ethane rejection mode; (15) pumping the third bottoms stream 102A/102Alt/102B prior to feeding the fractionation column 42 in ethane rejection mode; (16) warming the first bottoms stream in heat exchanger 30 prior to heat exchanger 20, through heat exchange with the feed stream after heat exchanger 20, in ethane rejection mode; (17) cooling the first bottoms stream 48A/48Alt/48B prior to heat exchanger 30 by passing the first bottoms stream through an expansion valve 50; (18) cooling the second portion of the feed stream 18C in heat exchanger 40, prior to heat exchanger 110, through heat exchange with a liquid stream 144C from a bottom portion of the fractionation column 42, in ethane retention mode; (19) returning side stream 140/142 to the fractionation tower 42, after heat exchange in heat exchanger 20, at a location lower than a withdrawal location in ethane retention mode; (20) returning side stream 54Alt/55Alt to the fractionation tower 42, after heat exchange in heat exchanger 20, at a location lower than a withdrawal location in ethane rejection mode; (21) passing the entirety of the second overhead stream 58A/58Alt/58B/58C and 70A/70Alt/70B/70C through heat exchangers 68 and 20, respectively, in either ethane retention mode or ethane rejection mode; and (21) wherein there is no heat exchange between only the second overhead stream 58C/70C and the recycled residue gas stream 116/118 in ethane retention mode.

The source of feed gas stream 12 is not critical to the systems and methods of the invention; however, natural gas drilling and processing sites with flow rates of 10 to 300 MMSCFD are particularly suitable. Where present, it is generally preferable for purposes of the present invention to remove as much of the water vapor and other contaminants from feed stream 12 prior to processing with systems 10A, 10A-2, 10B, or 10C. One of the primary advantages of the preferred embodiments of systems 10A and 10B according to the invention is to allow for high propane recovery and minimum ethane recovery without the need for $CO_2$ removal in the inlet gas stream or with reduced $CO_2$ pretreatment requirements. In the case of systems 10A, 10A-2, and 10B, the process will operate satisfactorily with up to 1.725% of inlet $CO_2$. Although the inlet gas stream can be pre-processed to remove excess $CO_2$ prior to feeding into systems 10A, 10A-2, or 10B, the higher $CO_2$ tolerance of these systems allows that step to be omitted or at least does not require as much $CO_2$ to be removed prior to feeding into systems 10A, 10A-2, or 10B, saving on overall processing costs. For system 10C, the $CO_2$ must be reduced to 0.14 percent or less in order to be further processed in ethane retention mode. The lower permissible amount of inlet $CO_2$ is due to the lower operating conditions for system 10C in ethane retention mode. Methods for removing water vapor, carbon dioxide, and other contaminants are generally known to those of ordinary skill in the art and are not described herein.

The specific operating parameters described herein are based on the specific computer modeling and feed stream parameters set forth above. These parameters and the various composition, pressure, and temperature values described above will vary depending on the feed stream parameters as will be understood by those of ordinary skill in the art. As used herein, "ethane recovery mode" or "ethane retention mode" refers to a system or method configured to recover 50% or more, preferably 80% or more, of the ethane from the feed stream in the NGL product stream (fractionation tower bottoms stream). As used herein, "ethane rejection mode" refers to a system or method configured to recover less than 50%, preferably less than 20%, of the ethane from the feed stream in the NGL product stream (fractionation tower bottoms stream). Any operating parameter, step, process flow, or equipment indicated as preferred or preferable herein may be used alone or in any combination with other preferred/preferable features. Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

I claim:

1. A method for processing a feed stream comprising methane, ethane, propane, and other components using a single fractionation column in an ethane retention mode to produce an NGL product stream and a residue gas stream, the method comprising:
   splitting the feed stream into two portions, a first portion having 40% to 75% of a molar flow rate of the feed stream and a second portion having a balance of the molar flow rate of the feed stream;
   combining the first portion of the feed stream and the second portion of the feed stream to form a combined feed stream;
   separating the combined feed stream in a first separator into a first overhead stream and a first bottoms stream;
   splitting the first overhead stream into a first portion and a second portion;
   splitting the first bottoms stream into a first portion and a second portion;
   separating the first portion of the first overhead stream, the second portion of the first overhead stream, the first portion of the first bottoms stream, the second portion of the first bottoms stream, and a recycled stream in the single fractionation column into a second overhead stream, a side stream, and a second bottoms stream;
   exchanging heat in a first heat exchanger by simultaneously passing each of the first portion of the feed stream, the recycled stream, an entirety of the second overhead stream, and the side stream through the first heat exchanger;
   exchanging heat in a second heat exchanger by simultaneously passing each of the entirety of the second overhead stream, the recycled stream, the first portion of the first bottoms stream, and the first portion of the first overhead stream through the second heat exchanger;
   cooling the second portion of the feed stream in a tube side of a reboiler of the single fractionation column, prior to the combining the second portion of the feed stream with the first portion of the feed stream, by heat exchange with the second bottoms stream; and
   reboiling the second bottoms stream on a shell side of the reboiler of the single fractionation column to produce a vapor stream and the NGL product stream;
   compressing the entirety of the second overhead stream after passing through the first heat exchanger;
   wherein in the first heat exchanger: (1) the first portion of the feed stream is cooled prior to the combining with the second portion of the feed stream, (2) the recycled stream is cooled prior to passing through the second heat exchanger, (3) the entirety of the second overhead stream is warmed after passing through the second heat exchanger, and (4) the side stream withdrawn from the single fractionation column is warmed prior to returning to the single fractionation column;
   wherein in the second heat exchanger: (1) the entirety of the second overhead stream is warmed prior to passing through the first heat exchanger, (2) the recycled stream is cooled after passing through the first heat exchanger and prior to the single fractionation column, (3) the first portion of the first bottoms stream is cooled prior to the single fractionation column, and (4) the first portion of the first overhead stream is cooled prior to the single fractionation column;

wherein the residue gas stream comprises the second overhead stream after the compressing;

wherein the side stream is the only side stream withdrawn from the single fractionation column for heat exchange with any portion of the feed stream, and the side stream exchanges heat with the first portion of the feed stream in the first heat exchanger and the side stream does not exchange heat with the second portion of the feed stream;

wherein no portion of the first bottoms stream exchanges heat with the first portion of the feed stream; and wherein no portion of the first bottoms stream exchanges heat with the second portion of the feed stream;

wherein the recycled stream is a portion of the residue gas stream;

wherein the NGL product stream comprises greater than 98% of the ethane from the feed stream; and wherein the other components comprise 0.14% or less $CO_2$.

2. The method of claim 1 further comprising combining the first portion of the first bottoms stream and the first portion of the first overhead stream prior to passing the first portion of the first bottoms stream and the first portion of the first overhead stream to the second heat exchanger;

wherein the NGL product stream comprises 99% to less than 100% of the ethane from the feed stream.

3. The method of claim 2 further comprising after cooling the second portion of the feed stream in the tube side of the reboiler, supplying external refrigerant to a third heat exchanger to cool in the third heat exchanger the second portion of the feed stream prior to combining the second portion of the feed stream with the first portion of the feed stream.

4. The method of claim 1 wherein there is no heat exchange between only the second overhead stream and the recycled stream.

5. The method of claim 4 wherein the NGL product stream comprises at least 98.64% but less than 100% of the ethane from the feed stream.

6. The method of claim 4 wherein the feed stream comprises 15% ethane and the NGL product stream comprises at least 99% but less than 100% of the ethane from the feed stream.

7. The method of claim 1 wherein the first heat exchanger consists of a single heat exchanger for heat exchange between the first portion of the feed stream, the recycled stream, the entirety of the second overhead stream, and the side stream passing through the first heat exchanger.

8. The method of claim 7 wherein the second heat exchanger consists of a single heat exchanger for heat exchange between the entirety of the second overhead stream, the recycled stream, the first portion of the first bottoms stream, and the first portion of the first overhead stream passing through the second heat exchanger.

9. The method of claim 8 further comprising combining the first portion of the first bottoms stream and the first portion of the first overhead stream prior to the passing the first portion of the first bottoms stream and the first portion of the first overhead stream to the second heat exchanger; and wherein no external refrigerant is supplied to the first heat exchanger.

10. The method of claim 1 wherein the other components in the feed stream comprise nitrogen and wherein the NGL product stream comprises 98.64% to 99% of the ethane from the feed stream.

11. A method for processing a feed stream comprising methane, ethane, propane, and other components using a single fractionation column in an ethane retention mode to produce an NGL product stream and a residue gas stream, the method comprising:

splitting the feed stream into two portions, a first portion and a second portion, wherein the second portion has 25% to 65% of a molar flow rate of the feed stream;

combining the first portion of the feed stream and the second portion of the feed stream to form a combined feed stream;

separating the combined feed stream in a first separator into a first overhead stream and a first bottoms stream;

splitting the first overhead stream into a first portion and a second portion;

splitting the first bottoms stream into a first portion and a second portion;

separating the first portion of the first overhead stream, the second portion of the first overhead stream, the first portion of the first bottoms stream, the second portion of the first bottoms stream, and a recycled stream in the single fractionation column into a second overhead stream and a second bottoms stream;

exchanging heat in a first heat exchanger by simultaneously passing each of a first set of streams through the first heat exchanger;

exchanging heat in a second heat exchanger by simultaneously passing each of a second set of streams through the second heat exchanger;

cooling the second portion of the feed stream in a tube side of a reboiler of the single fractionation column, prior to the combining the second portion of the feed stream with the first portion of the feed stream, by heat exchange with the second bottoms stream; and reboiling the second bottoms stream on a shell side of the reboiler of the single fractionation column to produce a vapor stream and the NGL product stream;

compressing an entirety of the second overhead stream after passing through the first heat exchanger;

wherein in the first set of streams in the first heat exchanger consists of: (1) the first portion of the feed stream, which is cooled prior to the combining with the second portion of the feed stream, (2) the recycled stream, which is cooled prior to passing through the second heat exchanger, (3) the entirety of the second overhead stream, which is warmed after passing through the second heat exchanger, and (4) a single side stream withdrawn from the single fractionation column, which is warmed prior to returning to the single fractionation column;

wherein in the second set of streams in the second heat exchanger consists of: (1) the entirety of the second overhead stream, which is warmed prior to passing through the first heat exchanger, (2) the recycled stream, which is cooled after passing through the first heat exchanger and prior to the single fractionation column, (3) the first portion of the first bottoms stream, which is cooled prior to the single fractionation column, and (4) the first portion of the first overhead stream, which is cooled prior to the single fractionation column;

wherein the residue gas stream comprises the second overhead stream after the compressing;

wherein no portion of the first bottoms stream exchanges heat with the first portion of the feed stream; and wherein no portion of the first bottoms stream exchanges heat with the second portion of the feed stream;

wherein the recycled stream is a portion of the residue gas stream;

wherein greater than 98% of the ethane from the feed stream is in the NGL product stream; and wherein the other components comprise 0.14% or less $CO_2$.

12. The method of claim 11 wherein 99% or more of the ethane from the feed stream is in the NGL product stream.

13. The method of claim 1 wherein the NGL product stream comprises at least 99% of the ethane from the feed stream.

14. The method of claim 1 wherein no portion of the NGL product stream exchanges heat with any portion of the feed stream.

15. The method of claim 2 wherein no portion of the NGL product stream exchanges heat with any portion of the feed stream.

16. The method of claim 11 wherein no portion of the NGL product stream exchanges heat with any portion of the feed stream.

17. The method of claim 2 wherein no portion of the NGL product stream passes through the first heat exchanger;

wherein no portion of the NGL product stream passes through the second heat exchanger.

18. The method of claim 11 wherein no portion of the NGL product stream passes through the first heat exchanger;

wherein no portion of the NGL product stream passes through the second heat exchanger.

* * * * *